(12) United States Patent
Ye et al.

(10) Patent No.: US 12,739,516 B2
(45) Date of Patent: Sep. 15, 2026

(54) LIGHT EMITTING APPARATUS, IMAGING SYSTEM, IMAGING APPARATUS, ELECTRIC UNIT, AND IMAGING METHOD

(71) Applicant: CANON KABUSHIKI KAISHA, Tokyo (JP)

(72) Inventors: Wenying Ye, Tokyo (JP); Yasuhiko Sano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 18/626,604

(22) Filed: Apr. 4, 2024

(65) Prior Publication Data

US 2024/0348937 A1 Oct. 17, 2024

(30) Foreign Application Priority Data

Apr. 13, 2023 (JP) ................................ 2023-065950
Jul. 26, 2023 (JP) ................................ 2023-121233

(51) Int. Cl.

*H04N 23/74* (2023.01)
*G03B 15/02* (2021.01)
*H01F 27/24* (2006.01)
*H01F 27/28* (2006.01)
*H04N 23/72* (2023.01)
*H04N 23/73* (2023.01)

(52) U.S. Cl.

CPC ............ *H04N 23/74* (2023.01); *G03B 15/02* (2013.01); *H01F 27/24* (2013.01); *H01F 27/2823* (2013.01); *H04N 23/72* (2023.01); *H04N 23/73* (2023.01)

(58) Field of Classification Search

CPC ........ H04N 23/74; H04N 23/72; H04N 23/73; G03B 15/02; G03B 15/05; H01F 27/24; H01F 27/2823

See application file for complete search history.

(56) References Cited

U.S. PATENT DOCUMENTS 9,049,361 B2 * 6/2015 Hirasawa ............... G02B 7/006
2004/0085026 A1 * 5/2004 Inochkin ................ H05B 41/30
315/200 A
2020/0077025 A1 * 3/2020 Yoshida ............... G02B 27/646

FOREIGN PATENT DOCUMENTS

JP 2002-170717 A 6/2002
JP 2011035339 A * 2/2011 ............. G03B 15/05
JP 2020-101753 A 7/2020

* cited by examiner

*Primary Examiner* — Nhan T Tran
(74) *Attorney, Agent, or Firm* — Venable LLP

(57) ABSTRACT

A light emitting apparatus includes: a light emitting component; an inductor electrically connected to the light emitting component; a conductive member arranged near the inductor; and a magnetic member arranged near the inductor, wherein the conductive member is arranged on at least one end side in a direction of a winding axis of the inductor so as to intersect the winding axis, and wherein the magnetic member is arranged on a side face side of the inductor.

34 Claims, 31 Drawing Sheets

100
103
114
110
113
111
104
112
10
105

100
104
105
103
114
110
111
113
10

TIME T0
TIME T1
TIME T2
TIME T3
TIME T4
CAPTURED IMAGE
FRONT CURTAIN
REAR CURTAIN
FRONT CURTAIN
REAR CURTAIN
FLASH EMISSION
READING
TIME

TIME T0
TIME T1
TIME T2
TIME T3
TIME T4
CAPTURED IMAGE
FRONT CURTAIN
REAR CURTAIN
FRONT CURTAIN
REAR CURTAIN
READING
FOCAL PLANE EMISSION
TIME 307
501
500

500
307
501

100
104
501
A'
307
501
500
103
A
105
Z
Y
X
P

307

500

307

501

100
103
104
105
307
500
501
A
A'
P
X
Y
Z 501
901
900
307
501
305
305a 501
305
901
900
307
305a 100
104
501
A'
901
900
307
305
103
A
305a
105
Z
Y
X
P

NORMALIZED MAGNETIC FLUX DENSITY [a. u.]
120%
100%
80%
60%
40%
20%
0%
100%
53%
95%
56%
50%
37%
30%
7%
ONLY INDUCTOR 307
COMPARATIVE EXAMPLE 1
COMPARATIVE EXAMPLE 2
COMPARATIVE EXAMPLE 3
EXAMPLE 1-1
EXAMPLE 1-2
EXAMPLE 2
EXAMPLE 3

NORMALIZED MAGNETIC FLUX DENSITY [a. u.]
1.2
1.0
0.8
0.6
0.4
0.2
0.0
1
10
100
1000
10000
100000
1000000
RELATIVE MAGNETIC PERMEABILITY OF MAGNETIC MATERIAL 501

TIME T0
TIME T1
TIME T2
TIME T3
TIME T4
CAPTURED IMAGE
FRONT CURTAIN
REAR CURTAIN
FRONT CURTAIN
REAR CURTAIN
FLASH EMISSION
READING
TIME

TIME T0
TIME T1
TIME T2
TIME T3
TIME T4
CAPTURED IMAGE
FRONT CURTAIN
REAR CURTAIN
FRONT CURTAIN
REAR CURTAIN
READING
FOCAL PLANE EMISSION
TIME

LIGHT EMITTING APPARATUS, IMAGING SYSTEM, IMAGING APPARATUS, ELECTRIC UNIT, AND IMAGING METHOD

BACKGROUND OF THE INVENTION

Field of the Invention

The present invention relates to a light emitting apparatus, an imaging system, an imaging apparatus, an electric unit, and an imaging method.

Description of the Related Art

Flash emitting apparatuses such as a stroboscope, which are light emitting apparatuses configured to emit a flash, have been used mainly as an optional component of imaging apparatuses such as a digital video camera, a digital still camera, or the like. These imaging apparatuses such as a digital video camera, a digital still camera, or the like have an imaging module having an image sensor. The radiation magnetic field of an inductor included in the light emitting apparatus affects operations of other apparatuses or other components in the same apparatus. In recent years, the shutter speed of image sensors has been increased, and in particular, imaging apparatuses having an electronic shutter is equipped with an ultrahigh-speed shutter that can achieve a shutter speed of 1/8000 seconds or shorter.

When an imaging apparatus is used at a shutter speed above a stroboscope coordination speed (in general, about 1/125 to 1/400 seconds), since a reading circuit of an image sensor is operated during an exposure period, a period of light emission of a flash emitting apparatus and an operation period of the reading circuit may overlap each other. Thus, the reading circuit of the image sensor is subjected to noise from the flash emitting apparatus, in particular, magnetic noise generated from an inductor included in the flash emitting apparatus, and this makes the problem of occurrence of image noise obvious as a result.

Japanese Patent Application Laid-Open No. 2002-170717 discloses an approach to reduce magnetic noise by arranging an external electrode that covers ends of a winding type inductor in the winding axis direction. Japanese Patent Application Laid-Open No. 2020-101753 discloses an approach to reduce magnetic noise by arranging a plate-like conductive member covering the winding axis direction in a winding type inductor.

In the approach disclosed in Japanese Patent Application Laid-Open No. 2002-170717, however, while magnetic noise in the winding axis direction may be reduced by the external electrode, it is not possible to reduce magnetic noise traveling around the external electrode and emitted from the side face of the inductor. In the approach disclosed in Japanese Patent Application Laid-Open No. 2020-101753, while the radiation magnetic field from the inductor is reduced by the conductive member, the inductance, which is an electrical characteristic of the inductor, is also reduced. It is required for inductors included in electric circuits in apparatuses, such as a flash emitting apparatus, to suppress or prevent an inductance reduction in order to ensure the operation of a drive circuit.

The present invention has been made in view of the problem described above and intends to provide a light emitting apparatus that can reduce a radiation magnetic field generated from an inductor and to provide an imaging system, an imaging apparatus, and an imaging method with the light emitting apparatus. The present invention has been made in view of the problem described above and intends to provide an electric unit that can suppress an inductance reduction of an inductor to a small level or prevent the same while reducing a radiation magnetic field generated from the inductor.

SUMMARY OF THE INVENTION

According to one aspect of the present invention, there is provided a light emitting apparatus including: a light emitting component; an inductor electrically connected to the light emitting component; and a conductive member, wherein the inductor includes a conductor wiring wound about a straight winding axis and has a first face and a second face that intersect the winding axis, wherein the conductive member is nonmagnetic and is arranged on the first face side with respect to the inductor, and wherein the light emitting apparatus satisfies that: (i) in a cross section including the winding axis, a first distance between an intersection of the winding axis with the conductive member and an intersection of the winding axis with the first face is longer than a second distance between an intersection of a line extending parallel to the winding axis at each of both ends of the inductor in the first face with the conductive member and each of both the ends of the inductor, and/or (ii) in a cross section including the winding axis, the conductive member is curved or bent protruding to the opposite side of the inductor so as to cover the inductor.

According to one aspect of the present invention, there is provided an electric unit including: an inductor including a conductor wiring wound about a straight winding axis and having a first face and a second face that intersect the winding axis; and a nonmagnetic conductive member arranged on the first face side with respect to the inductor, wherein the electric unit satisfies that: (i) in a cross section including the winding axis, a first distance between an intersection of the winding axis with the conductive member and an intersection of the winding axis with the first face is longer than a second distance between an intersection of a line extending parallel to the winding axis at each of both ends of the inductor in the first face with the conductive member and each of both the ends of the inductor, and/or (ii) in a cross section including the winding axis, the conductive member is curved or bent protruding to the opposite side of the inductor so as to cover the inductor.

Further features of the present invention will become apparent from the following description of exemplary embodiments with reference to the attached drawings.

BRIEF DESCRIPTION OF THE DRAWINGS

FIG. 6A, FIG. 6B, and FIG. 6C are illustration diagrams illustrating a configuration of a flash emitting apparatus according to a Comparative Example.

DESCRIPTION OF THE EMBODIMENTS

First Embodiment

A light emitting apparatus, an imaging apparatus, an imaging system, and an imaging method according to a first embodiment of the present invention will be described with reference to FIG. 1A to FIG. 7C. In the present embodiment, the light emitting apparatus will be described with an example of a flash emitting apparatus configured to emit flashes and having a flash discharge tube as a light emitting component. Note that the present invention is not limited to flash emitting apparatuses and can be widely applied to light emitting apparatuses configured to emit light.

Figures 1A, 1B:
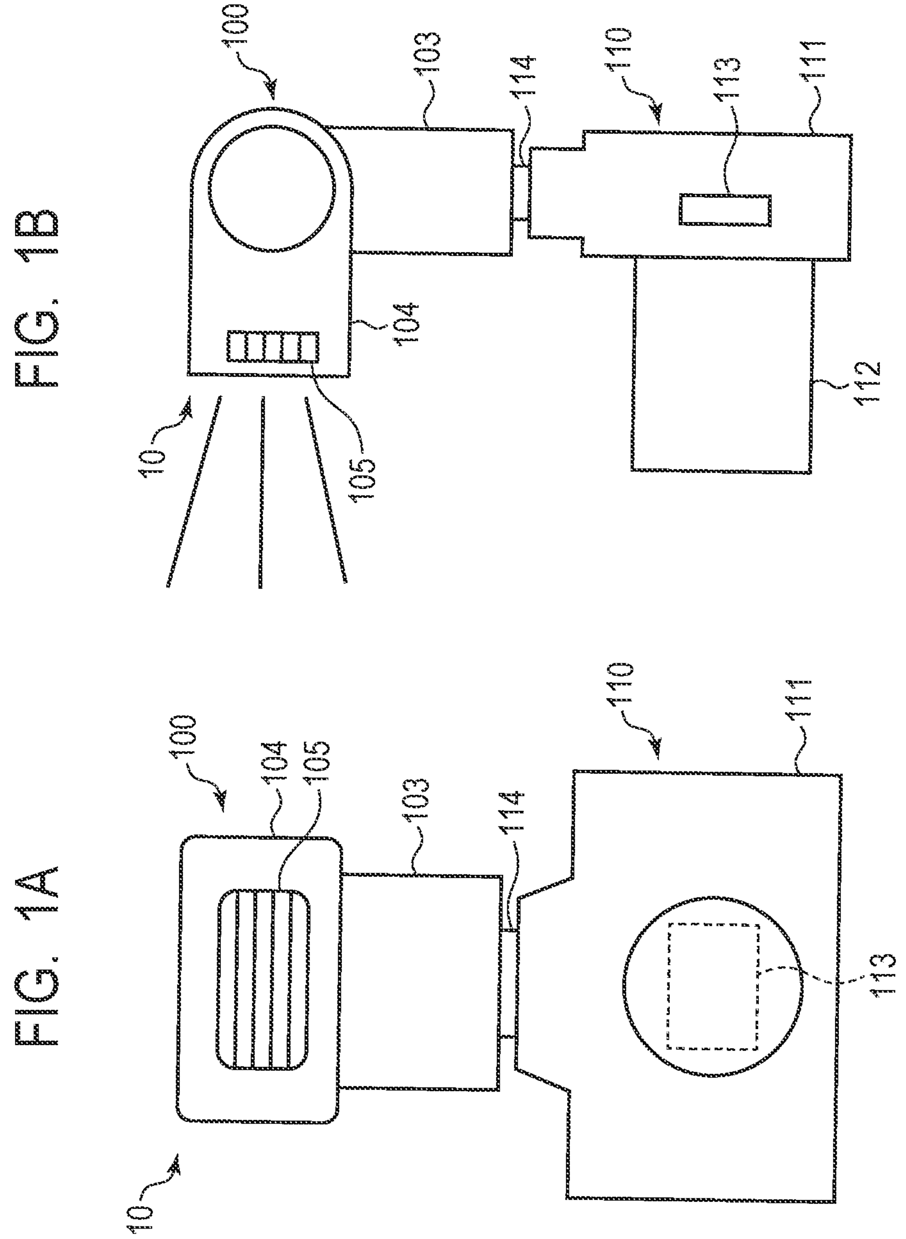
FIG. 1A and FIG. 1B are schematic diagrams illustrating a clip-on state of a flash emitting apparatus and an imaging apparatus included in an imaging system according to a first embodiment.
Figure 2:
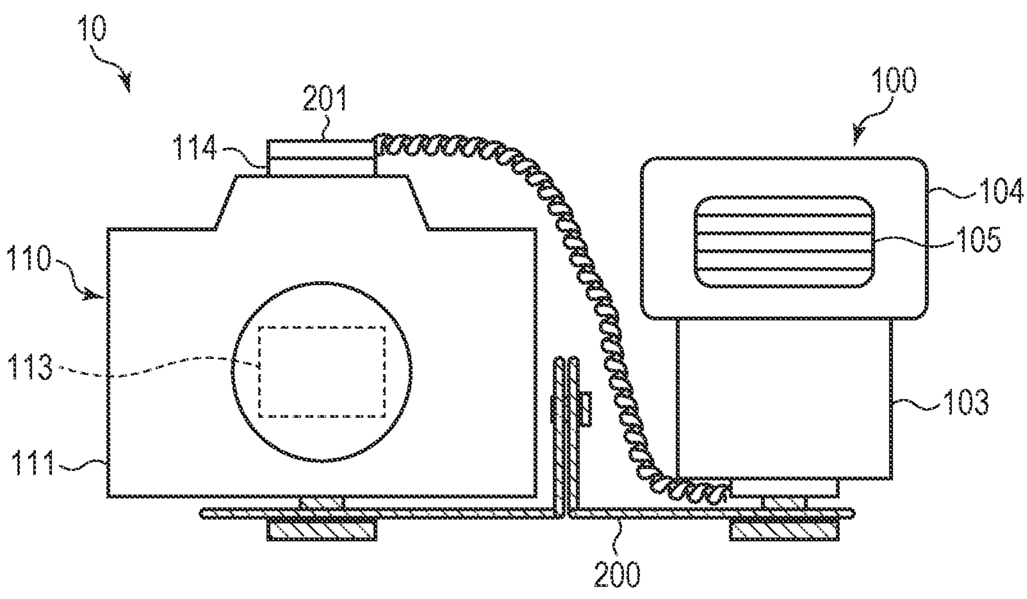
FIG. 2 is a schematic diagram illustrating a bracket state of the flash emitting apparatus and the imaging apparatus included in the imaging system according to the first embodiment.

First, the imaging system according to the present embodiment will be described with reference to FIG. 1A to FIG. 2. FIG. 1A and FIG. 1B are schematic diagrams illustrating a clip-on state of a flash emitting apparatus 100 and an imaging apparatus 110 included in an imaging system 10 according to the present embodiment. FIG. 2 is a schematic diagram illustrating a bracket state of the flash emitting apparatus 100 and the imaging apparatus 110 included in the imaging system 10 according to the present embodiment. As illustrated in FIG. 1A to FIG. 2, the imaging system 10 according to the present embodiment includes the flash emitting apparatus 100 and the imaging apparatus 110.

The imaging system 10 in which the flash emitting apparatus 100 and the imaging apparatus 110 are in the clip-on state will be first described with reference to FIG. 1A and FIG. 1B. FIG. 1A is a front view illustrating the flash emitting apparatus 100 and the imaging apparatus 110 in the clip-on state, and FIG. 1B is a side view illustrating the flash emitting apparatus 100 and the imaging apparatus 110 in the clip-on state.

As illustrated in FIG. 1A and FIG. 1B, the flash emitting apparatus 100 has a first casing 103, a second casing 104, and a flash discharge tube 105 that is a light emitting component. The first casing 103 is equipped with a battery, a power supply circuit, or the like (not illustrated) for supplying power to the flash emitting apparatus 100. The flash discharge tube 105 is provided to the second casing 104. The second casing 104 has a rotary mechanism and is provided to the first casing 103 rotatably by the rotary mechanism. Accordingly, the second casing 104 is configured such that the second casing 104 can be rotated to change the orientation of light emission from the flash discharge tube 105.

The imaging apparatus 110 has a casing 111, an interchangeable lens 112, an image sensor device 113, and an accessory shoe 114. The interchangeable lens 112 is configured to be detachable from the casing 111. The image sensor device 113 is provided to the casing 111. The image sensor device 113 is not particularly limited and is an image sensor such as a complementary metal-oxide semiconductor (CMOS) sensor, for example. The interchangeable lens 112 converges or diverges light from a subject to form a subject image on the image sensor device 113. The image sensor device 113 has arrayed photoelectric conversion elements that convert light from the interchangeable lens 112 into electric signals. The accessory shoe 114 is a hot shoe and is provided externally such as on the top of the casing 111 or the like.

For example, the imaging apparatus 110 has a rolling shutter implemented by the image sensor device 113 as an electronic shutter. Further, for example, the imaging apparatus 110 may have a focal plane shutter having a front curtain and a rear curtain as a mechanical shutter upstream of the image sensor device 113. The imaging apparatus 110 can implement an ultrahigh-speed shutter by the electronic shutter.

The flash emitting apparatus 100 is electrically and physically connected to the imaging apparatus 110 via the accessory shoe 114 and fixed to the imaging apparatus 110. In the flash emitting apparatus 100, light emission is controlled by a signal input from the imaging apparatus 110 via the accessory shoe 114. The flash discharge tube 105 emits light in accordance with a signal from the imaging apparatus 110 and irradiates a subject (not illustrated) with light. As illustrated in FIG. 1A and FIG. 1B, the state where the flash emitting apparatus 100 is arranged on the accessory shoe 114 of the imaging apparatus 110 is referred to as a clip-on state.

Next, the imaging system 10 in which the flash emitting apparatus 100 and the imaging apparatus 110 are in a bracket state will be described with reference to FIG. 2. FIG. 2 is a front view illustrating the flash emitting apparatus 100 and the imaging apparatus 110 are in the bracket state.

As illustrated in FIG. 2, the flash emitting apparatus 100 having the configuration described above is arranged in the side face direction of the imaging apparatus 110 having the configuration described above. The imaging apparatus 110 and the flash emitting apparatus 100 are coupled to each other by a bracket 200. The bracket 200 is a jig for fixing the imaging apparatus 110 and the flash emitting apparatus 100 thereto that are arranged in their side face directions. Further, the flash emitting apparatus 100 is electrically connected to the imaging apparatus 110 by an off-camera shoe cord 201. The off-camera shoe cord 201 is a cable for connecting the flash emitting apparatus 100 to the accessory shoe 114. As illustrated in FIG. 2, a state where the imaging apparatus 110 and the flash emitting apparatus 100 are arranged in their lateral directions is referred to as a bracket state.

In the imaging system 10, the flash emitting apparatus 100 and the imaging apparatus 110 can be brought into the clip-on state and also brought into the bracket state in accordance with the purpose of image capturing, the situation of image capturing, or the like. Note that the flash emitting apparatus 100 and the imaging apparatus 110 may be arranged in a state other than the clip-on state and the bracket state.

Figure 3:
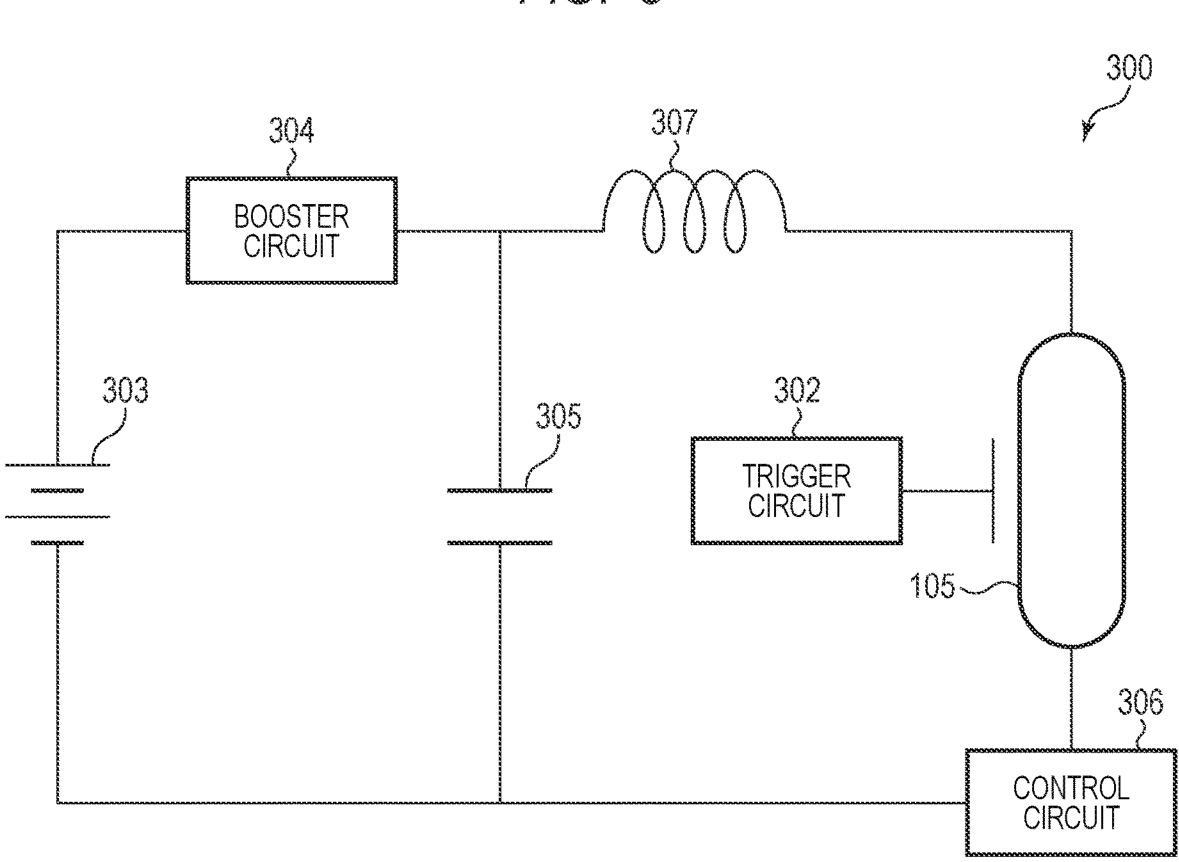
FIG. 3 is a block diagram illustrating an electric circuit of the flash emitting apparatus according to the first embodiment.

Next, the configuration of the flash emitting apparatus 100 will be described with reference to FIG. 3. FIG. 3 is a block diagram illustrating an electric circuit 300 of the flash emitting apparatus 100.

As illustrated in FIG. 3, the electric circuit 300 in the flash emitting apparatus 100 includes the flash discharge tube 105, a trigger circuit 302, a power supply 303, a booster circuit 304, a capacitor 305, a control circuit 306, and an inductor 307. The power supply 303 is connected to the input terminal of the booster circuit 304. The output terminal of the booster circuit 304 is connected to one end of the inductor 307. One end of the capacitor 305 is connected between the booster circuit 304 and the inductor 307 so that charges from the booster circuit 304 can be accumulated. The other end of the inductor 307 is connected to one end electrode of the flash discharge tube 105. The control circuit 306 is connected to the other end electrode of the flash discharge tube 105. Further, the trigger circuit 302 is arranged to the flash discharge tube 105 so that a pulsed voltage can be applied to the flash discharge tube 105.

The flash discharge tube 105 is a light emitting component having a glass tube made of quartz, high silica, or the like in which a rare gas such as xenon is sealed and whose both ends are provided with electrodes and sealed. Note that the light emitting component used for the flash emitting apparatus 100 can be selected from light sources with incandescent luminescence, discharge luminescence, electroluminescence, photoluminescence, and the like and is preferably the flash discharge tube 105 such as a xenon lamp; however, the light emitting component may be a solid light emitting component such as a light emitting diode. The trigger circuit 302 is a circuit that applies a pulsed voltage that ignites the flash discharge tube 105 to the flash discharge tube 105 via an ignition electrode and is formed of a transformer or the like. The power supply 303 is a power supply of, for example, about several volts to 10 volts for supplying power to the flash discharge tube 105 and is specifically a lithium-ion battery, a nickel-metal hydride battery, or the like. The booster circuit 304 is a circuit for converting the voltage of the power supply 303 into about several hundred volts and is formed of a DC/DC converter or the like. The capacitor 305 is a capacitor for accumulating charges supplied from the booster circuit 304, and an electrolytic capacitor for flashes that is adapted to instantaneous discharge is used in general. The capacitor 305 supplies the flash discharge tube 105 with power for causing the flash discharge tube 105 to emit light in accordance with accumulated charges. The control circuit 306 is a circuit that controls the amount of current flowing through the flash discharge tube 105 and is formed of a switching element such as an insulated gate bipolar transistor (IGBT) element. The control circuit 306 controls power supplied from the capacitor 305 to the flash discharge tube 105 via switching operation. The control circuit 306 can perform the switching operation at an operation frequency of 10 kHz to 1 MHz, for example. The inductor 307 electrically connected between the capacitor 305 and the flash discharge tube 105 is used for limiting current supplied from the capacitor 305 to the flash discharge tube 105. The inductor 307 may be a cored coil having a core or may be an air-core coil having no core and is often the air-core coil as described later.

Next, the operation of the flash emitting apparatus 100 will be described with reference to FIG. 3.

First, in response to a signal input from the imaging apparatus 110, the power supply 303 supplies power to the booster circuit 304, and the booster circuit 304 starts operation to boost and output the voltage. Once the booster circuit 304 starts the operation, charges are supplied to the capacitor 305 to start charging of the capacitor 305. Once the charged voltage of the capacitor 305 reaches a voltage required for light emission, the flash emitting apparatus 100 turns on an indicator thereof (not illustrated) to display that light emission is ready.

Next, once the photographer releases the shutter of the imaging apparatus 110, a signal for ignition is delivered to the flash emitting apparatus 100 from the imaging apparatus 110 via the accessory shoe 114. In the flash emitting apparatus 100 that has received the signal, the trigger circuit 302 applies a high-voltage pulse as a pulsed voltage to the flash discharge tube 105. This high-voltage pulse ionizes the gas inside the flash discharge tube 105, and this ionization lowers the impedance inside the flash discharge tube 105. In response, charges in the capacitor 305 starts being discharged through the flash discharge tube 105. At this time, the inductor 307 limits the current caused by discharge of charges from the capacitor 305 and suppresses a rapid increase of the current. Further, the control circuit 306 performs switching-on/off operation based on information from an optical feedback circuit or the like (not illustrated) to control the current so that the current flowing through the flash discharge tube 105 is at a desired current value. Accordingly, the flash emitting apparatus 100 emits a flash by discharge through the flash discharge tube 105.

Note that the flash emitting apparatus 100 can operate in a flash emission mode (single-emission mode) and can also operate in a focal plane emission mode (continual-emission mode). The flash emission mode is a mode to emit a flash once in a shutter operation. The focal plane emission mode is a mode to emit multiple times of flashes repeatedly, continually in a shutter operation.

When the flash emitting apparatus 100 emits light, significantly large current flows in the electric circuit 300. Specifically, the current flowing through the electric circuit 300 amounts several hundred amperes in the flash emission mode and amounts several ten amperes even in the focal plane emission mode. In particular, the mode that suffers from occurrence of noise in an image during an ultrahigh-speed shutter is the focal plane emission mode. This mode applies continual light emission where the control circuit 306 repeats switching on and off of current of several ten amperes. The frequency of the repetition is about several ten kHz when an IGBT element is used in the control circuit 306 or about several MHz when a gallium nitride (GaN) element or a silicon carbide (SiC) element, which has been attracting attention recently, is used. A flow of such current through the inductor 307 will cause a large magnetic field to occur around the inductor 307 due to electromagnetic induction. When such a magnetic field reaches the image sensor device 113, stripe-like noise occurs as image noise in a captured image.

The mechanism of occurrence of such image noise will be described with reference to FIG. 4A to FIG. 4C together with operations in three cases of a low-speed shutter, a high-speed shutter and an ultrahigh-speed shutter. In the three cases, the ultrahigh-speed shutter suffers from image noise, in the imaging apparatus 110. The flash emitting apparatus 100 emits light in the flash emission mode in a case of the low-speed shutter and emits light in the focal plane emission mode in cases of the high-speed shutter and the ultrahigh-speed shutter. Note that the low-speed shutter in such a case means a shutter speed below the flash coordination speed (about 1/125 to 1/250 seconds in general). Further, the high-speed shutter means a case where a mechanical shutter is used at a shutter speed above the flash coordination speed. Furthermore, the ultrahigh-speed shutter means a case where an electronic shutter is mainly used at a shutter speed above the flash coordination speed.

Figures 4A, 4B:
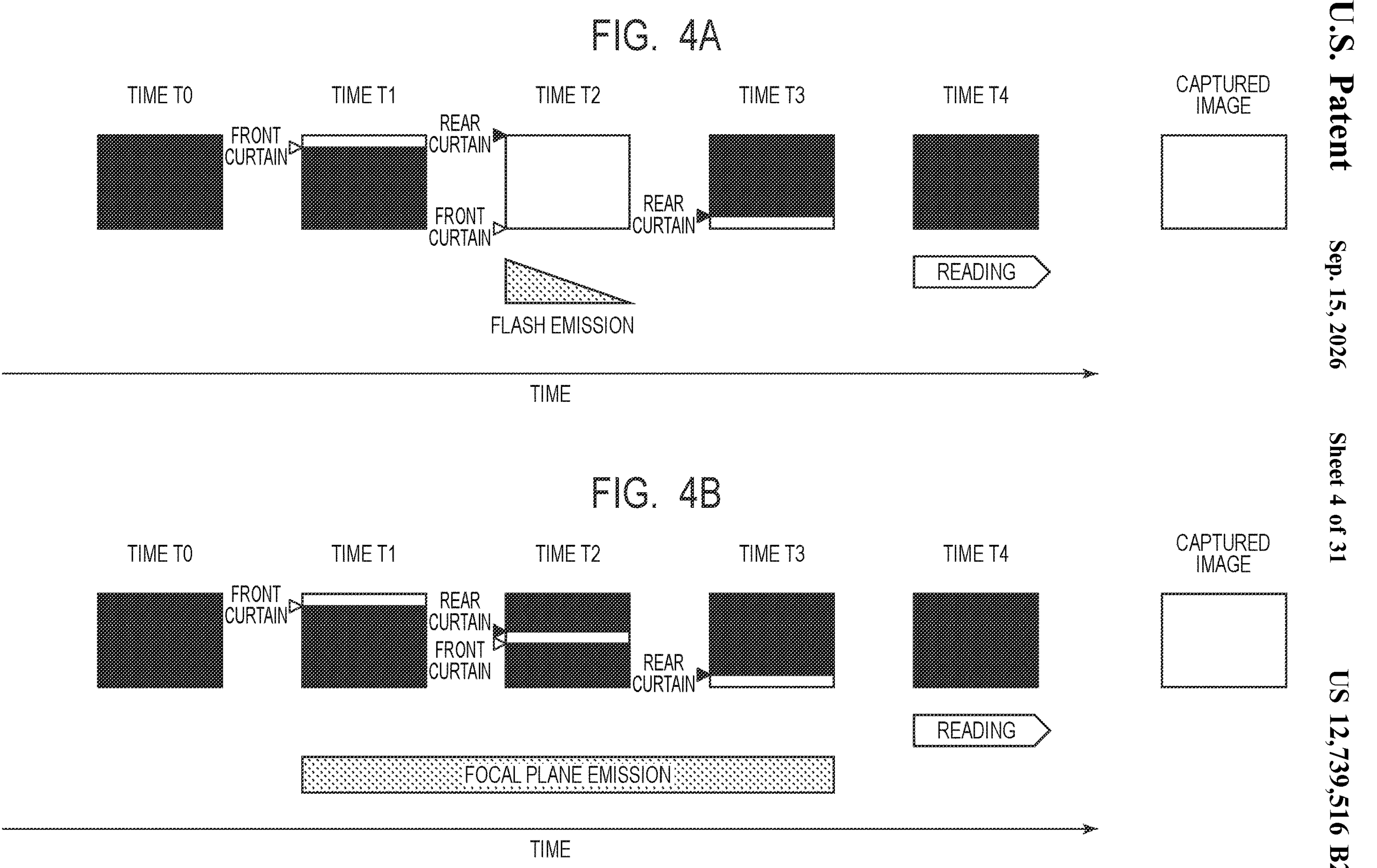
FIG. 4A, FIG. 4B, and FIG. 4C are schematic diagrams illustrating operations at various shutter speeds of the flash emitting apparatus according to the first embodiment.
Figure 4C:
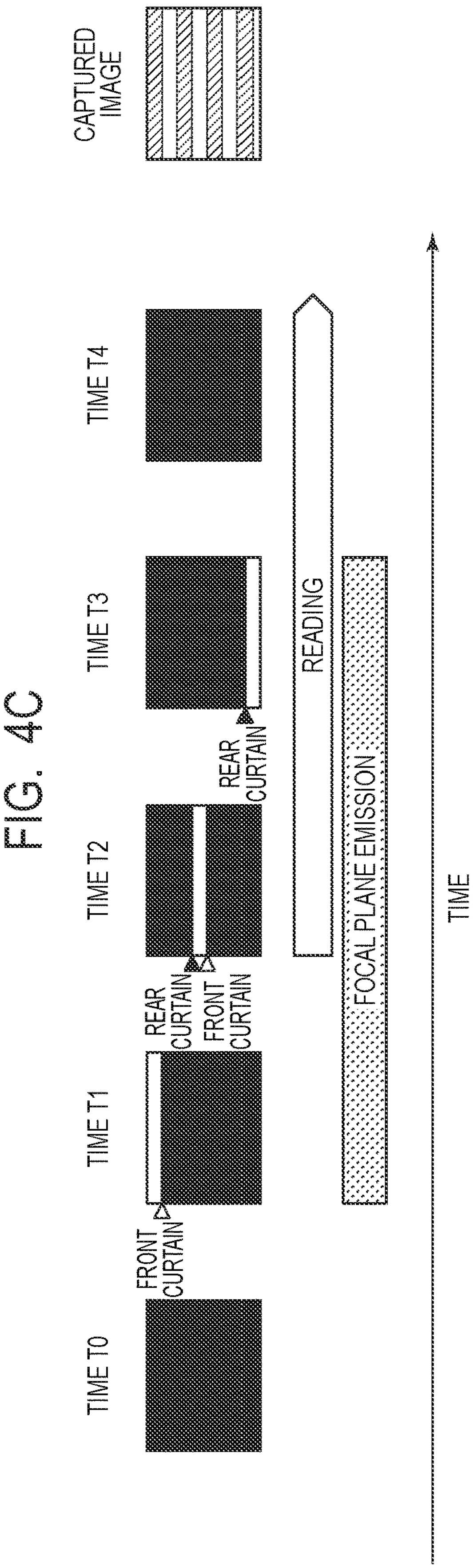

FIG. 4A illustrates the exposure state of the image sensor device 113, the reading timing of an image signal from the image sensor device 113, and the light emission timing of the flash emitting apparatus 100 in a case of light emission with the low-speed shutter and the flash emission mode. FIG. 4B illustrates the exposure state of the image sensor device 113, the reading timing of an image signal from the image sensor device 113, and the light emission timing of the flash emitting apparatus 100 in a case of light emission with the high-speed shutter and the focal plane emission mode. FIG. 4C illustrates the exposure state of the image sensor device 113, the reading timing of an image signal of the image sensor device 113, and the light emission timing of the flash emitting apparatus 100 in a case of light emission with the ultrahigh-speed shutter, which suffers from image noise, and the focal plane emission mode. Further, each diagram of FIG. 4A to FIG. 4C illustrates the state of the image sensor device 113 in a time course from time t0 to time t4 and illustrates a view of a final captured image taken by the imaging apparatus 110 on the right of the time course. As for the state of the image sensor device 113, a light-shielded state is illustrated in black, and an exposed state is illustrated in white. Note that, although the same symbols t0 to t4 are used as symbols indicating the times for the low-speed shutter, the high-speed shutter, and the ultrahigh-speed shutter, these symbols do not indicate the same time for respective shutter speeds and indicate different times in accordance with a shutter speed. For example, time t4 in FIG. 4C is earlier than time t4 in FIG. 4A by the difference in the shutter speed.

First, the case of the low-speed shutter illustrated in FIG. 4A will be described. In this case, once the shutter button for activating the shutter of the imaging apparatus 110 is pressed at time t0, the front curtain of the shutter is lowered at time t1, and exposure is started from the top of the image sensor device 113. Next, at time t2, while the front curtain of the shutter is in a completely lowered state, the rear curtain of the shutter has not yet started the operation. Thus, the image sensor device 113 is in a state where the entire image capturing region is exposed. Further, at the same time t2, the flash emitting apparatus 100 emits light in the flash emission mode, and the subject is irradiated with light at this time t2. The rear curtain is then gradually lowered, only the lower part of the image capturing region of the image sensor device 113 is exposed at time t3, and the exposure ends at time t4. Then, reading of an image signal that is an electrical signal photoelectrically converted from the image sensor device 113 is performed at and after time t4. A situation where the image sensor device 113 is irradiated with magnetic field noise and image noise thus occurs is caused by a case where magnetic field noise occurs in a reading period for an image signal. In the case illustrated in FIG. 4A, since the magnetic field noise at the time of light emission in the flash emission mode of the flash emitting apparatus 100 occurs at a time shifted from the reading period, the image noise, which would otherwise occur due to light emission of the flash emitting apparatus 100, does not occur.

Next, the case of the high-speed shutter illustrated in FIG. 4B will be described. Also in this case, once the shutter button for activating the shutter of the imaging apparatus 110 is pressed at time t0, the front curtain of the shutter is lowered at time t1, and exposure is started from the top of the image sensor device 113. Then, since it is required to shorten the exposure time because of a faster shutter speed than in the case illustrated in FIG. 4A, the rear curtain of the shutter starts being lowered before the front curtain of the shutter has been completely lowered. Therefore, at time t2, only a part of the image sensor device 113 exposed between the front curtain and the rear curtain is exposed. In this state, exposure is sequentially performed toward the lower part of the image sensor device 113, only the lower part is exposed at time t3, and the exposure performed by the image sensor device 113 is completed at time t4. Reading of an image signal performed by the image sensor device 113 is started from time t4. At this time, the flash emitting apparatus 100 continually, repeatedly performs emission of flashes during the exposure period from time t1 to time t3. This is because of the following reason. Since the exposure region on the image sensor device 113 is limited to a part of the image capturing region in the high-speed shutter, an unnatural image will be resulted if the subject is not irradiated with uniform light for respective regions. In such a way, repetition of emission of continual flashes performed by the flash emitting apparatus 100 during the entire exposure period is referred to as focal plane emission. No image noise occurs in a captured image in this case in the same manner as in the case illustrated in FIG. 4A, because the reading period for an image signal from the image sensor device 113 does not temporally overlap the emission period of the focal plane emission.

Next, the case of the ultrahigh-speed shutter will be described with reference to FIG. 4C. In this case, the exposure operation of the shutter and the timing of focal plane emission performed by the flash emitting apparatus 100 are the same as those in the case of the high-speed shutter illustrated in FIG. 4B. The case of the ultrahigh-speed shutter differs from the case of the high-speed shutter in the time of start of reading of an image signal from the image sensor device 113. That is, while reading is started from time t4 after an emission period of focal plane emission in the case of the high-speed shutter illustrated in FIG. 4B, reading is started from time t2 in an emission period of focal plane emission in the case of the ultrahigh-speed shutter illustrated in FIG. 4C. This is because of the following reason. Since the shutter speed is ultrahigh in the case of the ultrahigh-speed shutter, it is required to start reading of an image signal at a position where exposure has completed so far after start of the exposure. In particular, when an electronic shutter is used, it is required to perform reading after every exposure due to the operation system of the image sensor device 113. Herein, at time t2 and time t3, it can be seen that focal plane emission by the flash emitting apparatus 100 and reading of an image signal from the image sensor device 113 are performed at the same time. In such a case, if magnetic field noise occurring from the inductor 307 due to light emission reaches the image sensor device 113 during a reading period for an image signal from the image sensor device 113, stripe-like image noise will occur in a captured image.

As described previously, the current flowing through the inductor 307 in focal plane emission amounts several ten amperes, and the frequency thereof is about several ten kHz when an IGBT element is used in the control circuit 306. Thus, the coil used as the inductor 307 is often an air-core coil having no magnetic member as the core member. This is because of the following reason. That is, when the coil of the inductor 307 is a cored coil having a magnetic member as the core member, a magnetic field caused by current exceeding a certain amount flowing through the coil can exceed the maximum magnetic flux density of the magnetic member because of the magnetic saturation property of the magnetic member. When the maximum magnetic flux density is exceeded, the inductance of the inductor 307 rapidly decreases. Such a rapid decrease of the inductance causes larger current to flow, and this may lead to an operation malfunction of the electric circuit 300. To prevent this, many types of magnetic cores having a fine gap provided in the magnetic member are available. However, it is required to provide a wide gap in the magnetic core for the case of large current as with the flash emitting apparatus 100, and the magnetic field may leak out of such a gap.

Further, when an air-core coil is used as the inductor 307, it is conceivable to cover the air-core coil with a conductive member without magnetic saturation in order to reduce the magnetic field leaking out of the air-core coil. However, since large current flows through the inductor 307 as described above, heat is generated due to the resistance component of the inductor 307, and this makes it difficult to completely seal the air-core coil. In such a case, while it is required to provide a clearance for heat dissipation, a magnetic field is emitted out of this clearance, and this magnetic field may cause noise in the captured image.

Figures 5A, 5B, 5C:
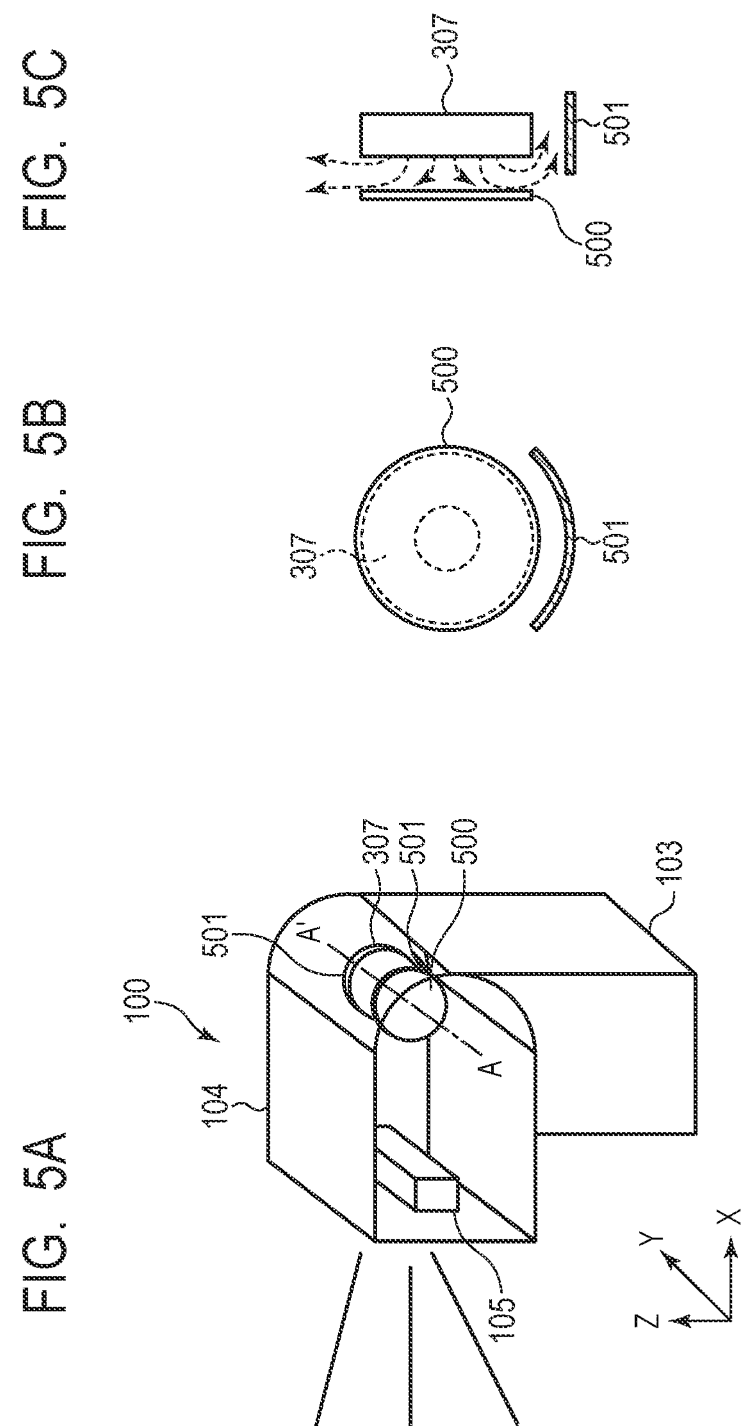
FIG. 5A, FIG. 5B, and FIG. 5C are schematic diagrams illustrating a configuration of the flash emitting apparatus according to the first embodiment.

The flash emitting apparatus 100 according to the present embodiment further has a conductive member 500 and a magnetic member 501 as illustrated in FIG. 5A to FIG. 5C in order to reduce a magnetic field, which is generated by the inductor 307 and reaches the image sensor device 113 as described above, and thereby reduce noise occurring in a captured image due to the magnetic field. The structure including the conductive member 500 and the magnetic member 501 of the flash emitting apparatus 100 according to the present embodiment will be described below with reference to FIG. 5A to FIG. 5C. FIG. 5A is a perspective view illustrating the structure of the flash emitting apparatus 100 according to the present embodiment. FIG. 5A illustrates XYZ coordinates having a Y-axis parallel to the longitudinal direction of the flash discharge tube 105 and a Z-axis orthogonal thereto, which form a YZ plane parallel to the light emission plane of the second casing 104 out of which light is emitted from the flash discharge tube 105 toward a subject P, and an X-axis orthogonal to the YZ plane. FIG. 5B is a side view of the inductor 307, the conductive member 500, and the magnetic member 501 illustrated in FIG. 5A when viewed in the Y direction. FIG. 5C is a sectional view illustrating a cross section of the inductor 307, the conductive member 500, and the magnetic member 501 in a plane parallel to the YZ plane taken along the one-dot chain line A-A' parallel to the Y direction in FIG. 5A. Further, broken lines with arrows in FIG. 5C indicate paths of the magnetic field emitted into space from the inductor 307 and indicate directions of the magnetic field by the arrows.

As illustrated in FIG. 5A, the inductor 307 is arranged on the backside of the flash discharge tube 105 in the second casing 104. Further, the inductor 307 is arranged such that the winding axis of the winding thereof is parallel to the longitudinal direction of the flash discharge tube 105. The conductive member 500 and the magnetic member 501 are arranged near the inductor 307, respectively.

The conductive member 500 is made of a conductive metal such as copper, aluminum, steel, or the like and, specifically, is formed of a plate such as a copper plate, an aluminum plate, a steel plate, or the like. As illustrated in FIG. 5A to FIG. 5C, the conductive member 500 is arranged near the inductor 307 so as to intersect the winding axis and face the winding axis orientation on at least one end side in the direction of the winding axis of the inductor 307. The conductive member 500 is preferably orthogonal to the winding axis of the inductor 307.

The conductive member 500 preferably has a diameter larger than or equal to a half the sum of the outer diameter of the inductor 307 and the inner diameter of the inductor 307 illustrated by broken lines in FIG. 5B, more preferably has a diameter larger than the outer diameter of the inductor 307 in terms of a sufficient reduction of the magnetic field. Note that the diameter of the conductive member 500 is the largest value of the distance across the conductive member 500 in a plane shape when viewed in the winding axis direction of the inductor 307 and means the diameter when the plane shape of the conductive member 500 is circular. Further, in terms of a sufficient reduction of the magnetic field, the distance between the conductive member 500 arranged near the inductor 307 and the inductor 307 is preferably less than or equal to 10 mm. The conductive member 500 has an effect of blocking and deflecting the magnetic field emitted from the inductor 307, as described later.

Further, in terms of a sufficient reduction of the magnetic field, the ratio of the thickness of the conductive member 500 to the skin depth of the conductive member 500 at an operation frequency of the control circuit 306 is preferably greater than or equal to 5%. Herein, the thickness of the conductive member 500 is the thickness in the winding axis direction of the inductor 307. Further, the skin depth is the distance where an electromagnetic wave entering a material is attenuated to 1/e and is given by $1/\sqrt{(\pi \cdot f \cdot \mu \cdot \sigma)}$ [m], where the magnetic permeability of the material is $\mu$ [H/m], the electric conductivity of the material is $\sigma$ [S/m], and the frequency of the electromagnetic wave is f [Hz]. The frequency f can be the operation frequency of the switching operation of the control circuit 306.

The magnetic member 501 is made of a magnetic member such as permalloy, amorphous alloys, FINEMET (registered trademark), or the like. As illustrated in FIG. 5A to FIG. 5C, the magnetic member 501 is arranged near the inductor 307 on the side face side thereof so as to be parallel to at least a part of the side face of the inductor 307. The magnetic member 501 is preferably arranged near the inductor 307 on the side face side thereof so as to cover at least a part of the side face of the inductor 307. In terms of a sufficient reduction of the magnetic field, the distance between the magnetic member 501 arranged near the inductor 307 and the inductor 307 is preferably less than or equal to 30 mm. The magnetic member 501 has an effect of attracting the magnetic field deflected by the conductive member 500, as described later. In the imaging system 10, the magnetic member 501 is located between the image sensor device 113 and the inductor 307.

Further, in terms of a sufficient reduction of the magnetic field or the like, the relative magnetic permeability of the magnetic member 501 is preferably 50 to 200,000 at the operating temperature of the flash emitting apparatus 100 and at the operation frequency of the control circuit 306. Further, in terms of a sufficient reduction of the magnetic field, the height of the magnetic member 501 in the winding axis direction of the inductor 307 is preferably greater than or equal to 75% of the thickness of the inductor 307 in the winding axis direction of the inductor 307.

Herein, the path of the magnetic field in the flash emitting apparatus 100 according to the present embodiment illustrated in FIG. 5C will be described in comparison with the path of the magnetic field in configurations of Comparative Example 1 to Comparative Example 3 illustrated in FIG. 6A to FIG. 6C. The configurations of Comparative Example 1 to Comparative Example 3 illustrated in FIG. 6A to FIG. 6C lack any one of the conductive member 500 and the magnetic member 501 illustrated in FIG. 5C or have a conductive member 600 arranged instead of the magnetic member 501. Also in FIG. 6A to FIG. 6C, broken lines with arrows indicate paths of the magnetic field emitted into space from the inductor 307 and indicate directions of the magnetic field by the arrows.

Figures 6A, 6B:
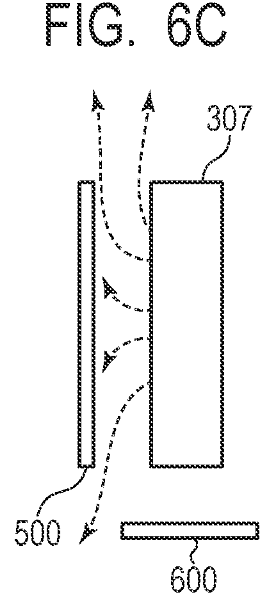

First, as illustrated in FIG. 6A, a case of Comparative Example 1 in which only the conductive member 500 out of the conductive member 500 and the magnetic member 501 is arranged to the inductor 307 and the magnetic member 501 is not arranged will be described. In such a case, the magnetic field emitted from the inductor 307 reaches the conductive member 500. This magnetic field generates eddy current in the conductive member 500 due to Faraday's law of electromagnetic induction. Due to this eddy current, a cancelling magnetic field to cancel the magnetic field emitted from the inductor 307 is generated, and this results in generation of an effect of reducing the magnetic field of the inductor 307. Accordingly, the magnetic field of the inductor 307 is significantly deflected near the conductive member 500, guided to the side face side of the inductor 307, and thus formed in a shape distributed upward or downward in FIG. 6A. In such a case, however, although the effect of reducing the magnetic field is obtained by the cancelling magnetic field, the magnetic field deflected upward or downward is eventually emitted into space. Therefore, in the case of Comparative Example 1 in which only the conductive member 500 is arranged, there is small effect of reducing the magnetic field reaching the image sensor device 113.

Next, as illustrated in FIG. 6B, a case of Comparative Example 2 in which only the magnetic member 501 out of the conductive member 500 and the magnetic member 501 is arranged to the inductor 307 and no conductive member 500 is arranged will be described. In such a case, since the magnetic member 501 attracts the magnetic field emitted from the inductor 307 near the magnetic member 501, the magnetic field emitted from the inductor 307 at the end of the inductor 307 is slightly weakened. In such a case, however, since neither conductive member nor magnetic member is arranged in the winding axis direction of the inductor 307, a large magnetic field may be emitted. Therefore, in the case of Comparative Example 2 in which only the magnetic member 501 is arranged, there is little effect of reducing the magnetic field reaching the image sensor device 113.

Next, a case of the flash emitting apparatus 100 according to the present embodiment in which both the conductive member 500 and the magnetic member 501 are arranged as illustrated in FIG. 5C will be described. In such a case, because the conductive member 500 is arranged in the same manner as in the case illustrated in FIG. 6A, a cancelling magnetic field is generated, and the magnetic field of the inductor 307 is reduced and guided to the side face side of the inductor 307. Such a magnetic field guided to the side face is directly emitted into space in the case illustrated in FIG. 6A. In contrast, in the case of the present embodiment illustrated in FIG. 5C, the magnetic member 501 is arranged near the deflected magnetic field. Thus, in the present embodiment, the magnetic member 501 attracts the magnetic field deflected to the side face side of the inductor 307, and this can reduce the magnetic field emission into space. Herein, since the magnetic field deflected to the side face side is reduced by the cancelling magnetic field due to the conductive member 500 and is smaller than the magnetic field emitted in the winding axis direction, no magnetic saturation of the magnetic member 501 occurs. As a result, in the present embodiment, the magnetic field reaching the image sensor device 113 can be reduced.

As described above, in the present embodiment, the magnetic field generated from the winding axis direction of the inductor 307 is cancelled by the conductive member 500, guided to the side face side of the inductor 307 by the conductive member 500, and further attracted by the magnetic member 501 on the side face side. Accordingly, in the present embodiment, the magnetic field generated from the flash emitting apparatus 100 can be effectively reduced.

The imaging apparatus 110 can control the exposure time on the image sensor device 113 by using the electronic shutter and capture an image of the subject P while controlling the flash emitting apparatus 100 to cause the flash emitting apparatus 100 to emit light in the flash emission mode or the focal plane emission mode. In the present embodiment, the magnetic field reaching the image sensor device 113 can be reduced as described above. Thus, in the present embodiment, noise in a captured image can be reduced even when the imaging apparatus 110 captures an image of the subject P with an ultrahigh-speed shutter with the electronic shutter while causing the flash emitting apparatus 100 to emit light in the focal plane emission mode. When the imaging apparatus 110 is used to capture an image of the subject P in such a way, the flash emitting apparatus 100 and the imaging apparatus 110 may be in the clip-on state, may be in the bracket state, or may be in a state other than these states. However, when the imaging apparatus 110 is used to capture an image of the subject P, it is preferable to establish a state where the magnetic member 501 is located between the inductor 307 and the image sensor device 113. When an image is captured in such a state, the magnetic field reaching the image sensor device 113 can be reliably reduced.

As discussed above, in the present embodiment, the radiation magnetic field generated from the inductor 307 can be reduced by the conductive member 500 and the magnetic member 501, and noise in a captured image taken by the imaging apparatus 110 can thus be reduced.

Herein, as illustrated in FIG. 6C, a case of Comparative Example 3 in which the conductive member 500 is arranged to the inductor 307 and the conductive member 600 separate from the conductive member 500 is also arranged thereto instead of the magnetic member 501 will be described. This case is the same as the case of FIG. 6A in that the magnetic field of the inductor 307 is reduced and deflected by the cancelling magnetic field of the conductive member 500. Furthermore, in such a case, the magnetic field on the side face side of the inductor 307 is distributed so as to be repulsive to the conductive member 600. That is, in such a case, while the magnetic field emitted from the inductor 307 is reduced and deflected in the side face direction by the conductive member 500, the deflected magnetic field will be repelled by the conductive member 600, leaked out of the clearance between the conductive member 500 and the conductive member 600, and emitted into space. Therefore, in the case of Comparative Example 3 in which the conductive member 600 is arranged instead of the magnetic member 501, there is small effect of reducing the magnetic field reaching the image sensor device 113.

Figures 7A, 7B, 7C:
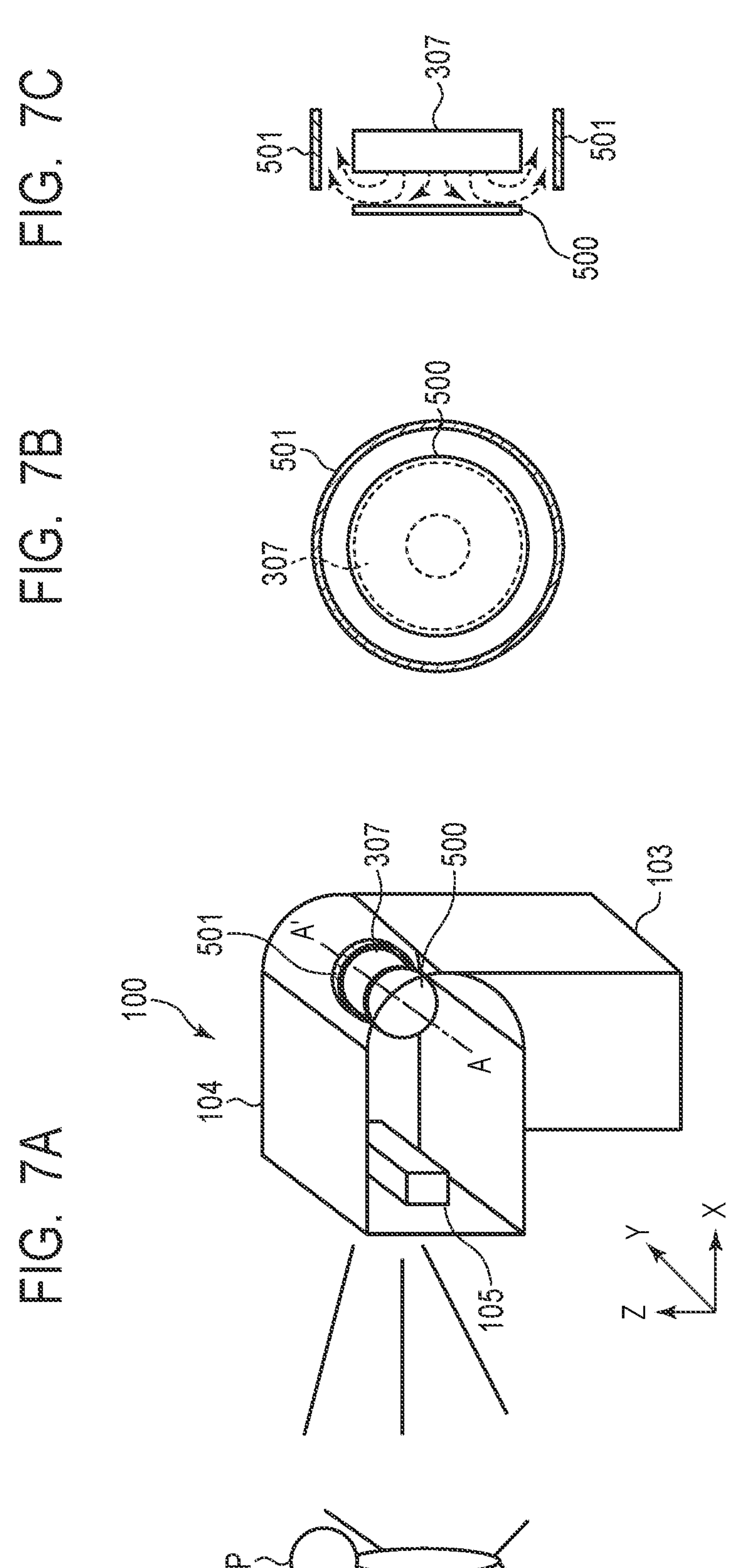
FIG. 7A, FIG. 7B, and FIG. 7C are schematic diagrams illustrating another configuration of the flash emitting apparatus according to the first embodiment.

Note that, although the magnetic member 501 is arranged only partially circumferentially to the inductor 307 as illustrated in FIG. 5A to FIG. 5C because some component member or the like (not illustrated) may be arranged around the inductor 307 in the present embodiment, the arrangement is not limited thereto. FIG. 7A to FIG. 7C correspond to FIG. 5A to FIG. 5C, respectively, and illustrate other examples of the arrangement of the magnetic member 501. For example, the magnetic member 501 may be arranged entirely circumferentially to the inductor 307 so as to cover the entire circumference as illustrated in FIG. 7A to FIG. 7C. Because the magnetic member 501 is arranged entirely circumferentially to the inductor 307, a further magnetic field reduction effect can be obtained.

Second Embodiment

A flash emitting apparatus according to a second embodiment of the present invention will be described with reference to FIG. 8A to FIG. 8C. Note that the same components as those of the first embodiment are labeled with the same references, and the description thereof will be omitted or simplified.

Figures 8A, 8B, 8C:
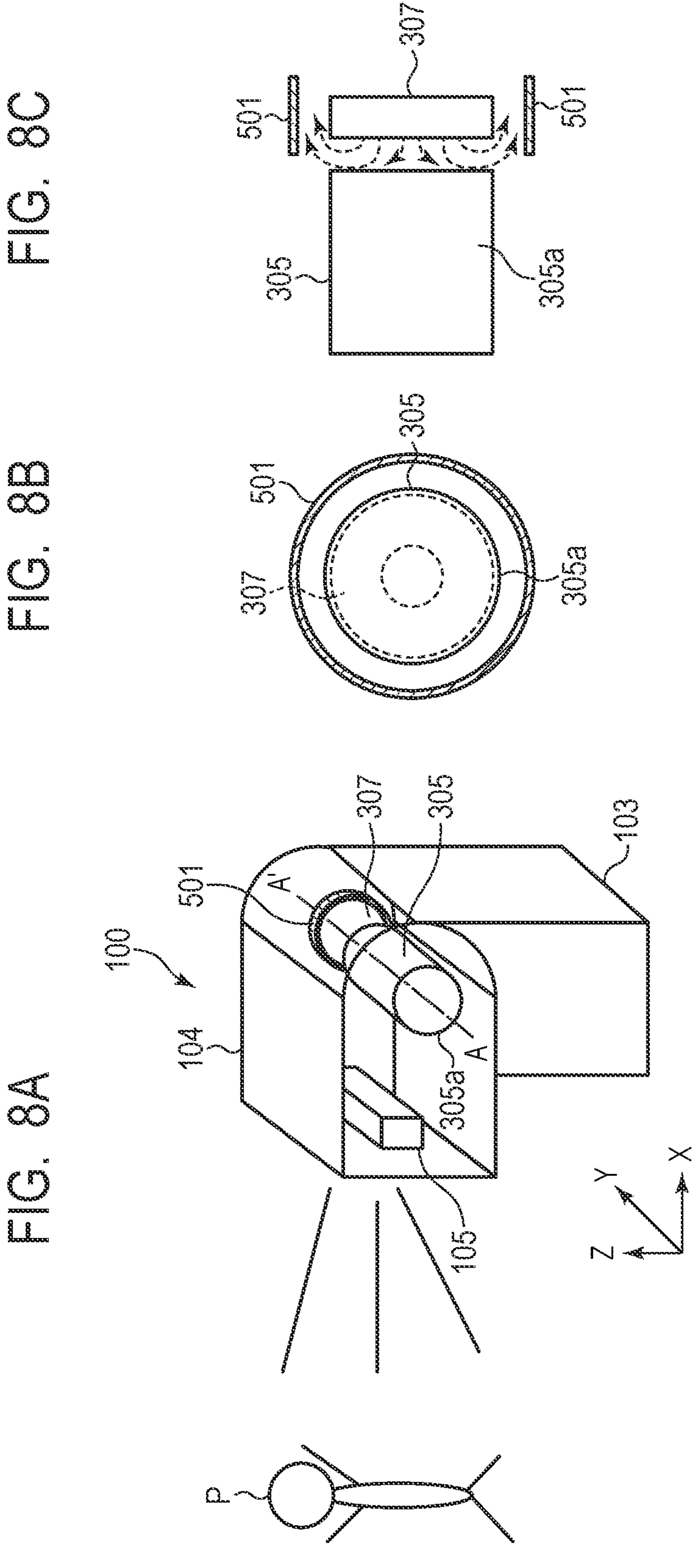
FIG. 8A, FIG. 8B, and FIG. 8C are schematic diagrams illustrating a configuration of a flash emitting apparatus according a second embodiment.

FIG. 8A is a perspective view illustrating the structure of the flash emitting apparatus 100 according to the present embodiment. FIG. 8A illustrates the XYZ coordinates in the same manner as in FIG. 5A. FIG. 8B is a side view of the capacitor 305, the inductor 307, and the magnetic member 501 illustrated in FIG. 8A when viewed in the Y direction. FIG. 8C is a sectional view illustrating a cross section of the capacitor 305, the inductor 307, and the magnetic member 501 taken along a plane parallel to the YZ plane on the one-dot chain line A-A' in FIG. 8A. Further, broken lines with arrows in FIG. 8C indicate paths of the magnetic field emitted into space from the inductor 307 and indicate directions of the magnetic field by the arrows.

The capacitor 305 used in the flash emitting apparatus 100 is required to discharge accumulated charges at once in light emission and thus, in general, is preferably an electrolytic capacitor for flash emitting apparatuses that enables fast discharge. An electrolytic capacitor is formed of electrodes and an electrolytic solution, and the electrodes and the electrolyte are covered with an exterior casing that is a conductive metal casing made of aluminum or the like in order to seal the electrodes and the electrolytic solution. In the present embodiment, instead of the conductive member 500 of the first embodiment, a conductive metal casing is used as the exterior casing of the capacitor 305, which is an electrolytic capacitor, to reduce the magnetic field of the inductor 307.

As illustrated in FIG. 8A to FIG. 8C, the capacitor 305 is arranged near the inductor 307 on one end side in the direction of the winding axis of the inductor 307. The capacitor 305 is an electrolytic capacitor having a metal casing **305*a* accommodating electrodes and an electrolytic solution. The metal casing 305*a* has a wall intersecting the winding axis and facing the winding axis orientation on one end side in the direction of the winding axis of the inductor 307. The wall of the metal casing 305*a* is preferably orthogonal to the winding axis of the inductor 307. The wall of the metal casing 305*a* preferably has a diameter larger than or equal to a half the sum of the outer diameter of the inductor 307 and the inner diameter of the inductor 307, more preferably has a diameter larger than the outer diameter of the inductor 307 in the same manner as the conductive member 500 of the first embodiment. The diameter of the wall of the metal casing 305***a* is the largest value of the distance across the wall in a plane shape when viewed in the winding axis direction of the inductor 307 and means the diameter when the plane shape of the wall is circular.

Note that the exterior casing of the capacitor 305 is not necessarily required to be the metal casing 305*a* and may be any casing made of a conductive member. As discussed above, the metal casing 305*a* may be used instead of the conductive member 500 of the first embodiment. In other words, the metal casing 305*a* may be used as the conductive member 500 of the first embodiment.

The metal casing 305*a* of the capacitor 305 arranged as described above plays a role similar to the conductive member 500 of the first embodiment. That is, when a magnetic field emitted from the inductor 307 reaches the metal casing 305*a* of the capacitor 305, this magnetic field generates eddy current in the metal casing 305*a* of the capacitor 305 due to Faraday's law of electromagnetic induction. Due to this eddy current, a cancelling magnetic field to cancel the magnetic field emitted from the inductor 307 is generated, and this results in generation of the effect of reducing the magnetic field of the inductor 307. Accordingly, the magnetic field of the inductor 307 is significantly deflected near the metal casing 305*a* of the capacitor 305, guided to the side face side of the inductor 307, and thus formed in a shape distributed upward or downward in FIG. 8C. For further explanation, the magnetic field is attracted to the magnetic member 501 because the magnetic member 501 is arranged in the same manner as in the first embodiment, and magnetic field emission into space can be reduced. Note that, although FIG. 8A to FIG. 8C illustrate the case where the magnetic member 501 is arranged in the same manner as in the case illustrated in FIG. 7A to FIG. 7C, the magnetic member 501 may also be arranged in the same manner as in the case illustrated in FIG. 5A to FIG. 5C in the present embodiment.

As discussed above, also in the present embodiment, the radiation magnetic field generated from the inductor 307 can be reduced by the capacitor 305 having the metal casing 305*a* and the magnetic member 501, and noise in a captured image taken by the imaging apparatus 110 can thus be reduced.

Note that the metal casing 305*a* may be arranged near the inductor 307 on one end side in the direction of the winding axis of the inductor 307 via the conductive member 500 in the same manner as in the present embodiment in addition to the configuration of the first embodiment illustrated in FIG. 5A to FIG. 5C.

Third Embodiment

A flash emitting apparatus according to a third embodiment of the present invention will be described with reference to FIG. 9A to FIG. 9C. Note that the same components as those of the first and second embodiments are labeled with the same references, and the description thereof will be omitted or simplified.

Figures 9A, 9B, 9C:
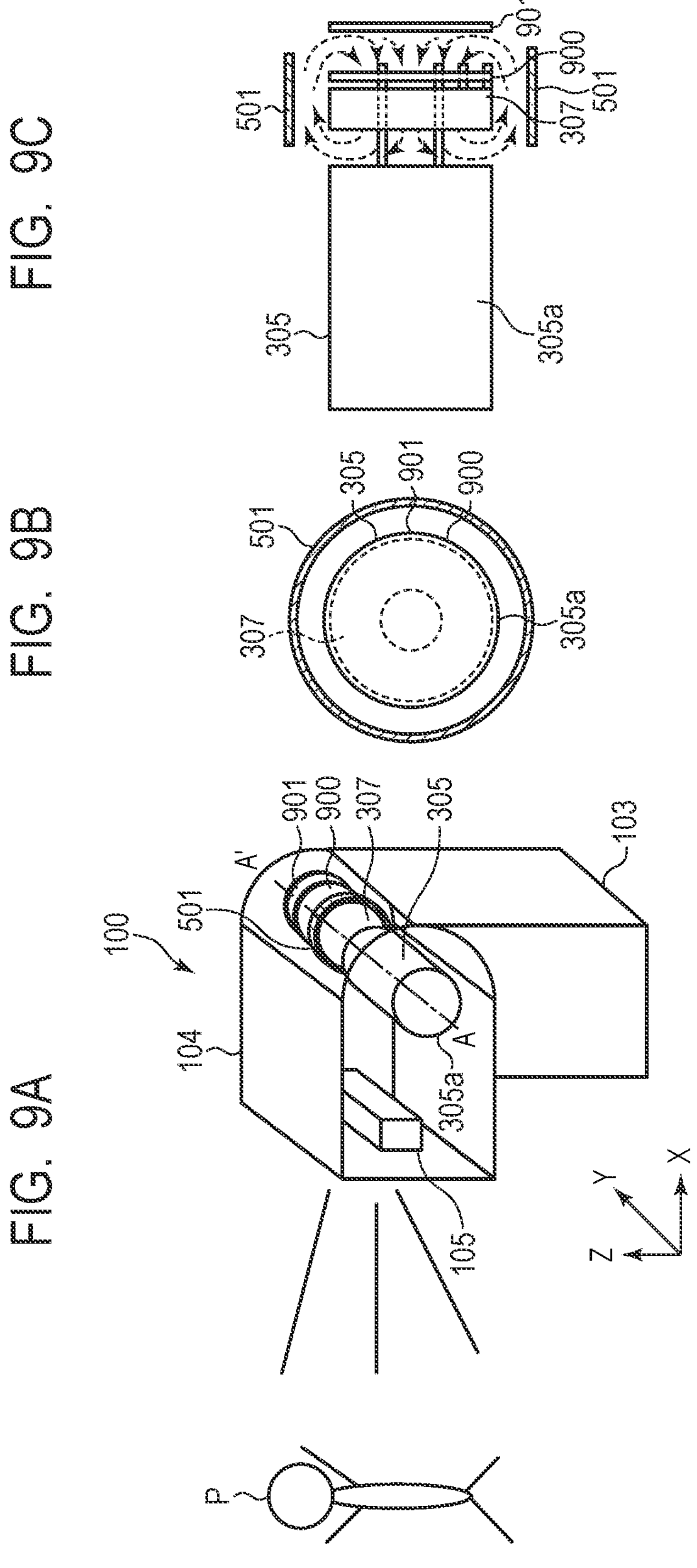
FIG. 9A, FIG. 9B, and FIG. 9C are schematic diagrams illustrating a configuration of a flash emitting apparatus according a third embodiment.

FIG. 9A is a perspective view illustrating the structure of the flash emitting apparatus 100 according to the present embodiment. FIG. 9A illustrates the XYZ coordinates in the same manner as in FIG. 5A. FIG. 9B is a side view of the capacitor 305, the inductor 307, the magnetic member 501, a printed wiring board 900, and a conductive member 901 illustrated in FIG. 9A when viewed in the Y direction. FIG. 9C is a sectional view illustrating a cross section of the capacitor 305, the inductor 307, the magnetic member 501, the printed wiring board 900, and the conductive member 901 taken along a plane parallel to the YZ plane on the one-dot chain line A-A' in FIG. 9A. Further, broken lines with arrows in FIG. 9C indicate paths of the magnetic field emitted into space from the inductor 307 and indicate directions of the magnetic field by the arrows.

As illustrated in FIG. 9A to FIG. 9C, the flash emitting apparatus 100 according to the present embodiment further has the printed wiring board 900 and the conductive member 901 in addition to the configuration of the second embodiment illustrated in FIG. 8A to FIG. 8C. The printed wiring board 900 and the conductive member 901 are arranged near the inductor 307, respectively. Note that the flash emitting apparatus 100 may further have the printed wiring board 900 and the conductive member 901 in addition to the configuration of the first embodiment illustrated in FIG. 5A to FIG. 5C.

The printed wiring board 900 is arranged on the other end side, which is the opposite to the one end on which the capacitor 305 is arranged in the direction of the winding axis of the inductor 307. The printed wiring board 900 connects the capacitor 305 and the inductor 307 to each other.

The conductive member 901 is made of a conductive metal such as copper, aluminum, steel, or the like in the same manner as the conductive member 500 of the first embodiment and, specifically, is formed of a plate such as a copper plate, an aluminum plate, a steel plate, or the like. The conductive member 901 is arranged via the printed wiring board 900 so as to intersect the winding axis and face the winding axis orientation on the other end side in the direction of the winding axis of the inductor 307. The conductive member 901 is preferably orthogonal to the winding axis of the inductor 307. The conductive member 901 preferably has a diameter larger than or equal to a half the sum of the outer diameter of the inductor 307 and the inner diameter of the inductor 307, more preferably has a diameter larger than the outer diameter of the inductor 307 in terms of a sufficient reduction of the magnetic field. Note that the diameter of the conductive member 901 is the largest value of the distance across the conductive member 901 in a plane shape when viewed in the winding axis direction of the inductor 307 and means the diameter when the plane shape of the conductive member 901 is circular. Further, in terms of a sufficient reduction of the magnetic field, the distance between the conductive member 901 arranged near the inductor 307 and the inductor 307 is preferably less than or equal to 10 mm.

Herein, the effect resulted from the conductive member 901 will be described. The conductive member 901 is arranged on the opposite side from the capacitor 305 via the inductor 307. Therefore, when the magnetic field emitted from the inductor 307 reaches the conductive member 901, this magnetic field generates eddy current in the conductive member 901 due to Faraday's law of electromagnetic induction. Due to this eddy current, a cancelling magnetic field to cancel the magnetic field emitted from the inductor 307 is generated, and this results in generation of an effect of reducing the magnetic field of the inductor 307. Accordingly, the magnetic field of the inductor 307 is significantly deflected near the conductive member 901, guided to the side face side of the inductor 307, and thus formed in a shape distributed upward or downward in FIG. 9C. This magnetic field is attracted to the magnetic member 501 in the same manner as in the first and second embodiments, and magnetic field emission into space can be reduced. Note that, although FIG. 9A to FIG. 9C illustrate the case where the magnetic member 501 is arranged in the same manner as in the case illustrated in FIG. 7A to FIG. 7C, the magnetic member 501 may also be arranged in the same manner as in the case illustrated in FIG. 5A to FIG. 5C in the present embodiment.

As discussed above, in the present embodiment, the radiation magnetic field generated from the inductor 307 can be further reduced by the capacitor 305 having the metal casing 305*a*, the conductive member 901, and the magnetic member 501, and noise in a captured image taken by the imaging apparatus 110 can thus be further reduced.

Note that, although the case where the conductive member 901 separate and independent of the printed wiring board 900 is used has been described in the present embodiment, the arrangement is not limited thereto. For example, a multilayered printed wiring board may be used for the printed wiring board 900, and a conductive layer in some of the layers can be used as the conductive member 901. That is, the printed wiring board 900 may include the conductive member 901.

Further, also in the present embodiment, the conductive member 901 may not be arranged in the same manner as in the first embodiment. Further, also in the first and second embodiments, the conductive member 901 may be arranged in the same manner as in the present embodiment.

EXAMPLES

Electromagnetic field simulations were performed on Example 1-1, Example 1-2, Example 2, and Example 3, Comparative Example 1, Comparative Example 2, and Comparative Example 3, and a case where only the inductor 307 is arranged in space, and reduction effects of the magnetic field emitted from the inductor 307 were evaluated. Example 1-1 corresponds to the case of the first embodiment illustrated in FIG. 5A to FIG. 5C. Example 1-2 corresponds to the case of the first embodiment illustrated in FIG. 7A to FIG. 7C. Example 2 corresponds to the case of the second embodiment illustrated in FIG. 8A to FIG. 8C. Example 3 corresponds to the case of the third embodiment illustrated in FIG. 9A to FIG. 9C. Comparative Example 1 corresponds to the case illustrated in FIG. 6A. Comparative Example 2 corresponds to the case illustrated in FIG. 6B. Comparative Example 3 corresponds to the case illustrated in FIG. 6C. The case where only the inductor 307 is arranged in space is a case where neither conductive member 500 nor magnetic member 501 of Example 1 is arranged.

As the electromagnetic field simulator, Maxwell by Ansys Inc. was used. Further, as the inductor 307, an air-core coil having an outer diameter of 23 mm, an inner diameter of 3 mm, and a thickness in the winding axis direction of 3.6 mm with 82 turns was used. Further, the control circuit 306 was set to repeat switching operation at 20 KHz.

Further, in Example 1-1, Example 1-2, Comparative Example 1, and Comparative Example 3, as the conductive member 500, a copper member having a diameter of 23 mm, a thickness of 100 μm, and an electric conductivity of $5.8\times10^7$ S/m was used. In Example 2 and Example 3, as the metal casing 305*a* of the capacitor 305, which is an alternative to the conductive member 500, an aluminum casing having a thickness of 400 μm and an electric conductivity of $3.8\times10^7$ S/m was used.

Further, in Example 1-1 and Comparative Example 2, as the magnetic member 501, a member having a diameter of 23.2 mm, a height of 5.7 mm, a thickness of 18 μm, and a relative magnetic permeability of 70,000 and having a circular arc shape with a central angle of 90 degrees around the inductor 307 was used. In Example 1-2, Example 2, and Example 3, as the magnetic member 501, a member having a diameter of 23.2 mm, a height of 5.7 mm, a thickness of 18 μm, and a relative magnetic permeability of 70,000 and having a circumferential shape surrounding the circumference of the inductor 307 was used. In Comparative Example 3, as the conductive member 600, which is an alternative to the magnetic member 501, a copper member having a diameter of 23.2 mm, a height of 5.7 mm, a thickness of 18 μm, and an electric conductivity of $5.8\times10^7$ S/m and having a circular arc shape with a central angle of 90 degrees around the inductor 307 was used. Furthermore, in Example 3, as the conductive member 901, a copper member having a diameter of 23 mm, a thickness of 100 μm, and an electric conductivity of $5.8\times10^7$ S/m was used.

Figure 10:
FIG. 10 is a graph illustrating a normalized magnetic flux density of a magnetic field reaching an image sensor device in Examples and Comparative Examples.

FIG. 10 is a graph illustrating results of the magnetic flux density of the magnetic field reaching the image sensor device 113 found by electromagnetic field simulations for the case where only the inductor 307 is arranged in space, Example 1-1, Example 1-2, Example 2, Example 3, Comparative Example 1, Comparative Example 2, and Comparative Example 3. In FIG. 10, the magnetic flux density of the magnetic field reaching the image sensor device 113 when only the inductor 307 is arranged in space is defined as 100%, and under such a definition, relative degrees for respective examples are indicated.

As illustrated in FIG. 10, in the case of Example 1-1, the magnetic flux density was reduced to 50% compared to the case where only the inductor 307 was arranged in space, and a further magnetic field reduction effect was obtained compared to respective Comparative Examples.

Further, in the case of Example 1-2, the magnetic flux density was reduced to 37% compared to the case where only the inductor 307 was arranged in space, and a further magnetic field reduction effect was obtained compared to Example 1-1. Further, in the case of Example 2, the magnetic flux density was reduced to 30% compared to the case where only the inductor 307 was arranged in space, that is, a magnetic field reduction effect as much as 70% was obtained. Furthermore, in the case of Example 3, the magnetic flux density was reduced to 7% compared to the case where only the inductor 307 was arranged in space, that is, a magnetic field reduction effect as much as 93% was obtained.

Figure 11:
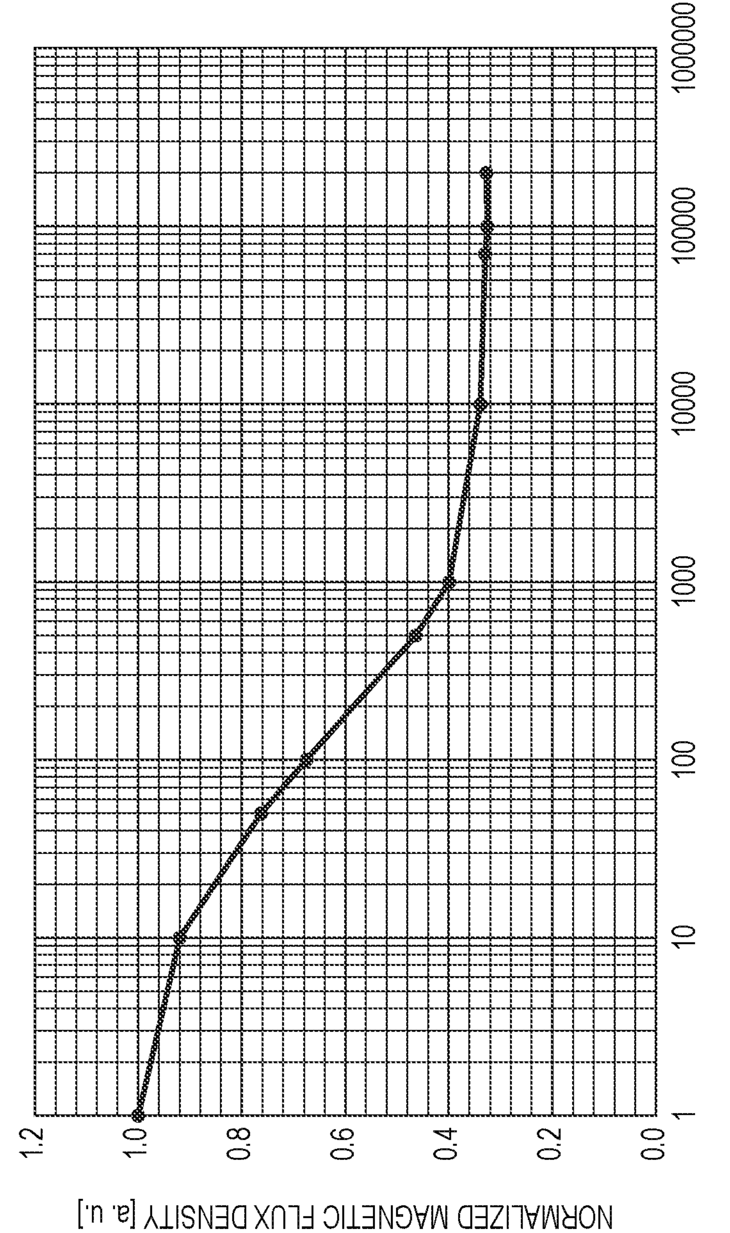
FIG. 11 is a graph illustrating a relationship between the relative magnetic permeability of a magnetic member and the normalized magnetic flux density.

FIG. 11 is a graph illustrating a normalized magnetic flux density of the magnetic field reaching the image sensor device 113 when the relative magnetic permeability of the magnetic member 501 was changed in Example 1-2. In the normalized magnetic flux density in FIG. 11, the magnetic flux density is normalized under the definition that the magnetic flux density is 1 when the relative magnetic permeability of the magnetic member 501 is 1, that is, when the magnetic member 501 is not arranged. It is found from FIG. 11 that, when the relative magnetic permeability of the magnetic member 501 is greater than or equal to 50, a reduction effect by 20% or greater is obtained for the magnetic flux density with the magnetic member 501 being arranged.

Figure 12:
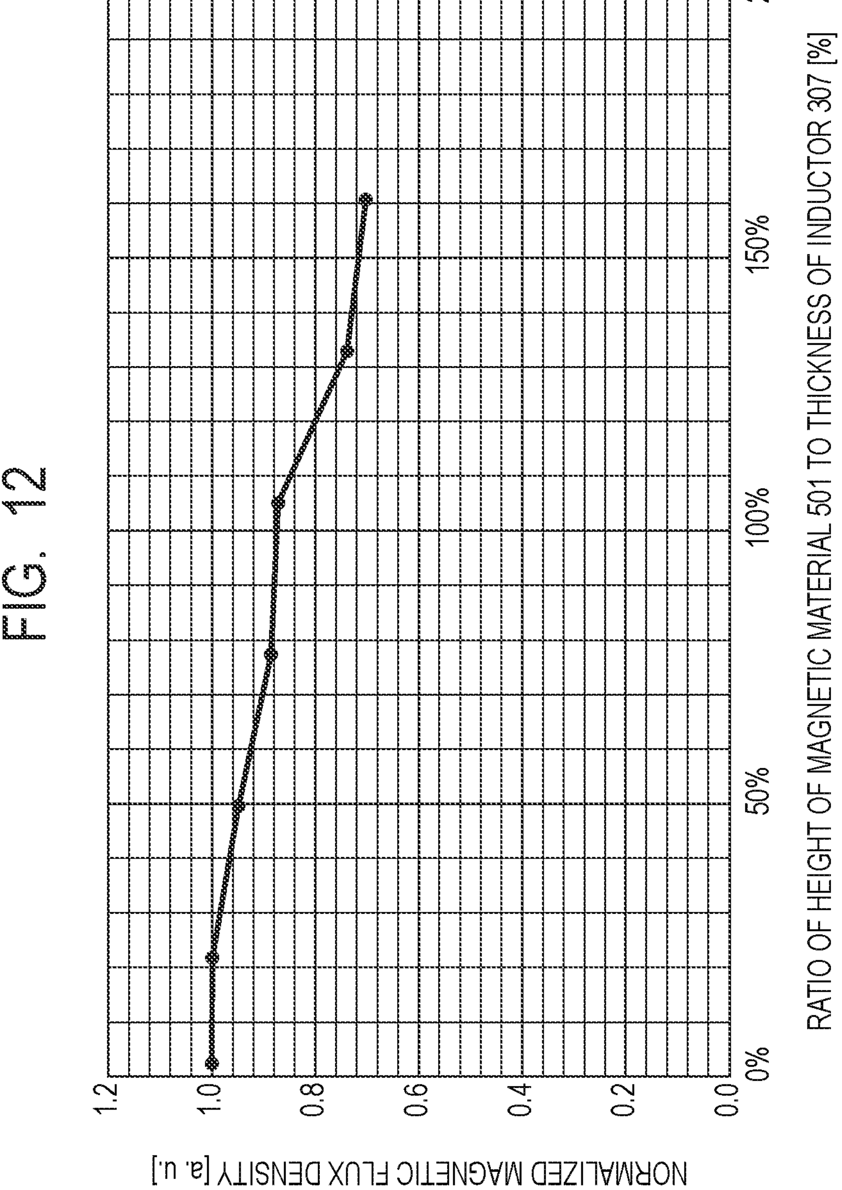
FIG. 12 is a graph illustrating a relationship between the height of the magnetic member and the normalized magnetic flux density.

FIG. 12 is a graph illustrating the normalized magnetic flux density of the magnetic field reaching the image sensor device 113 when the height of the magnetic member 501 to the thickness of the inductor 307 was changed in Example 1-2. The thickness of the inductor 307 and the height of the magnetic member 501 are those in the winding axis direction of the inductor 307, respectively. In the normalized magnetic flux density in FIG. 12, the magnetic flux density is normalized under the definition that the magnetic flux density is 1 when the magnetic member 501 is not arranged.

It is found from FIG. 12 that, when the height of the magnetic member 501 is greater than or equal to 75% of the thickness of the inductor 307, a reduction effect by 10% or greater is obtained for the magnetic flux density.

Figure 13:
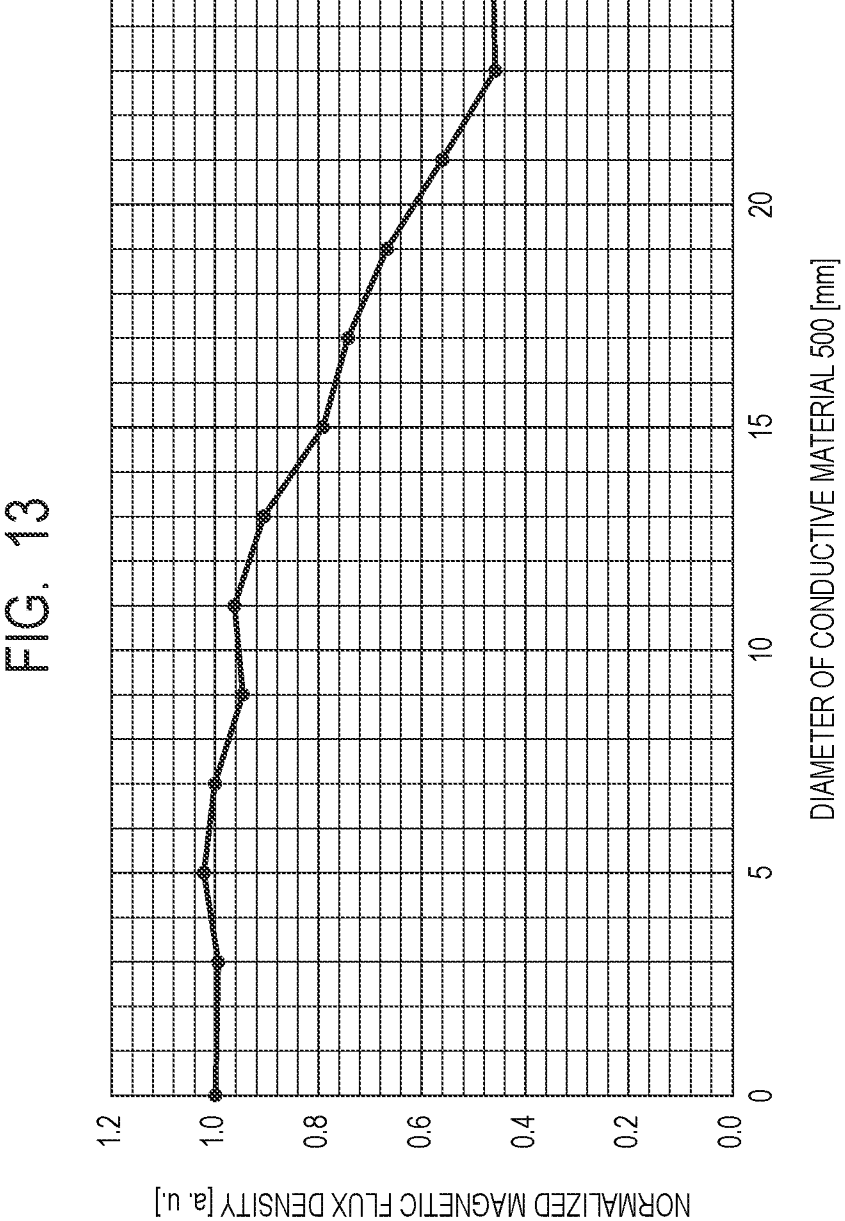
FIG. 13 is a graph illustrating a relationship between the diameter of a conductive member and the normalized magnetic flux density.

FIG. 13 is a graph illustrating the normalized magnetic flux density of the magnetic field reaching the image sensor device 113 when the diameter of the conductive member 500 was changed in Example 1-2. In the normalized magnetic flux density in FIG. 13, the magnetic flux density is normalized under the definition that the magnetic flux density is 1 when the diameter of the conductive member 500 is 0 mm, that is, when the conductive member 500 is not arranged. It is found from FIG. 13 that, when the outer diameter of the conductive member 500 is greater than or equal to (the outer diameter+the inner diameter)/2 of the inductor 307, that is, greater than or equal to 13 mm ((23+3)/2) in the case of the present Example, a reduction effect by 10% or greater is obtained for the magnetic flux density.

Figure 14:
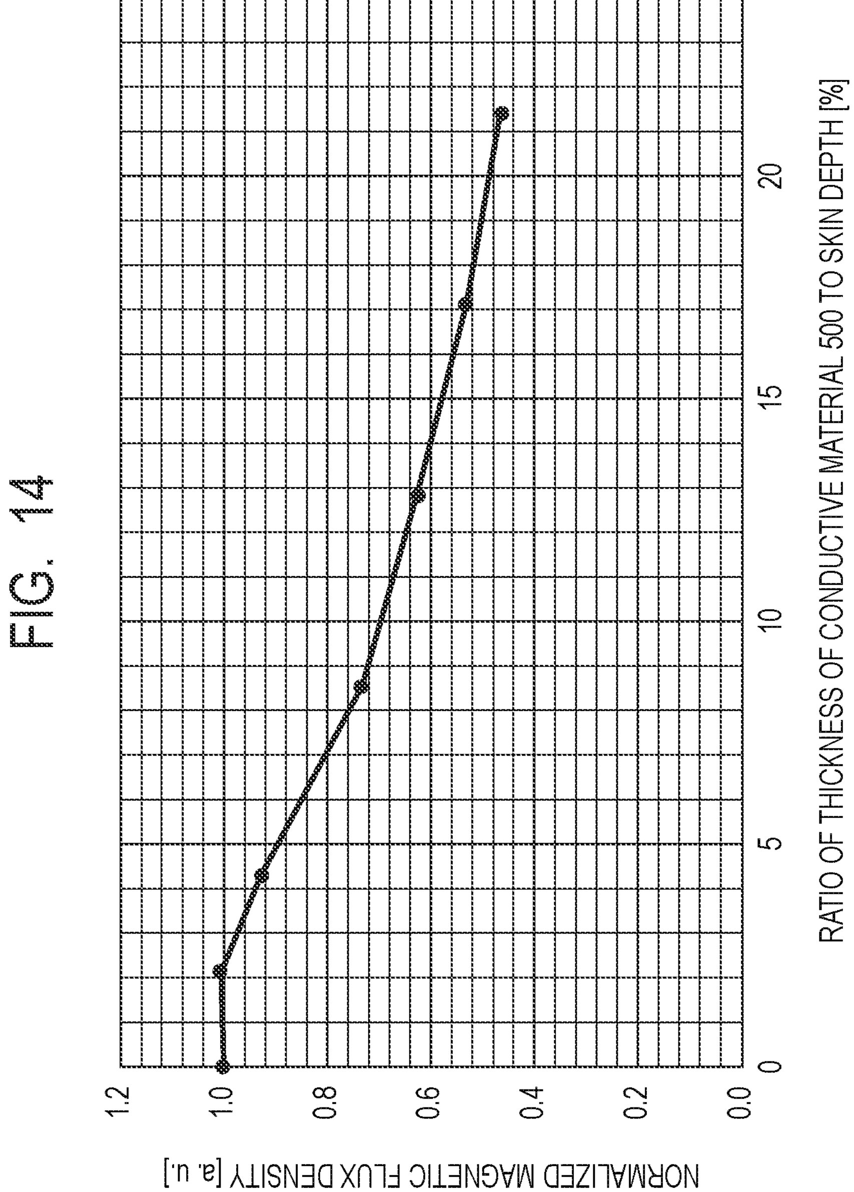
FIG. 14 is a graph illustrating a relationship between the skin depth of the conductive member and the normalized magnetic flux density.

FIG. 14 is a graph illustrating the normalized magnetic flux density of the magnetic field reaching the image sensor device 113 when the ratio of the thickness of the conductive member 500 to the skin depth of the conductive member 500 found from the material of the conductive member 500 and the frequency of the switching operation of the control circuit 306 was changed in Example 1-2. In the normalized magnetic flux density in FIG. 14, the magnetic flux density is normalized under the definition that the magnetic flux density is 1 when the conductive member 500 is not arranged. Herein, it is found from FIG. 14 that, when the ratio of the thickness of the conductive member 500 to the skin depth is greater than or equal to 5%, a reduction effect by 10% or greater is obtained for the magnetic flux density.

Figure 15:
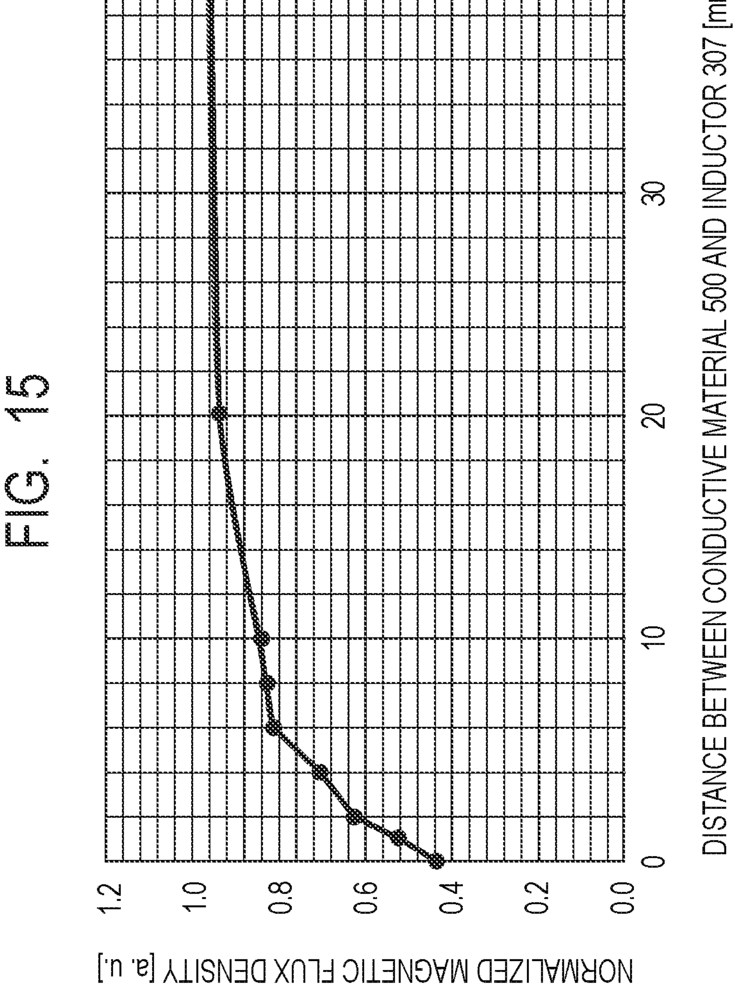
FIG. 15 is a graph illustrating a relationship between the distance between the conductive member and an inductor and the normalized magnetic flux density.

FIG. 15 is a graph illustrating the normalized magnetic flux density of the magnetic field reaching the image sensor device 113 when the distance between the conductive member 500 and the inductor 307 was changed in Example 1-2. It is found from FIG. 15 that, when the distance between the conductive member 500 and the inductor 307 is 10 mm or less, a reduction effect by 10% or greater is obtained for the magnetic flux density.

Figure 16:
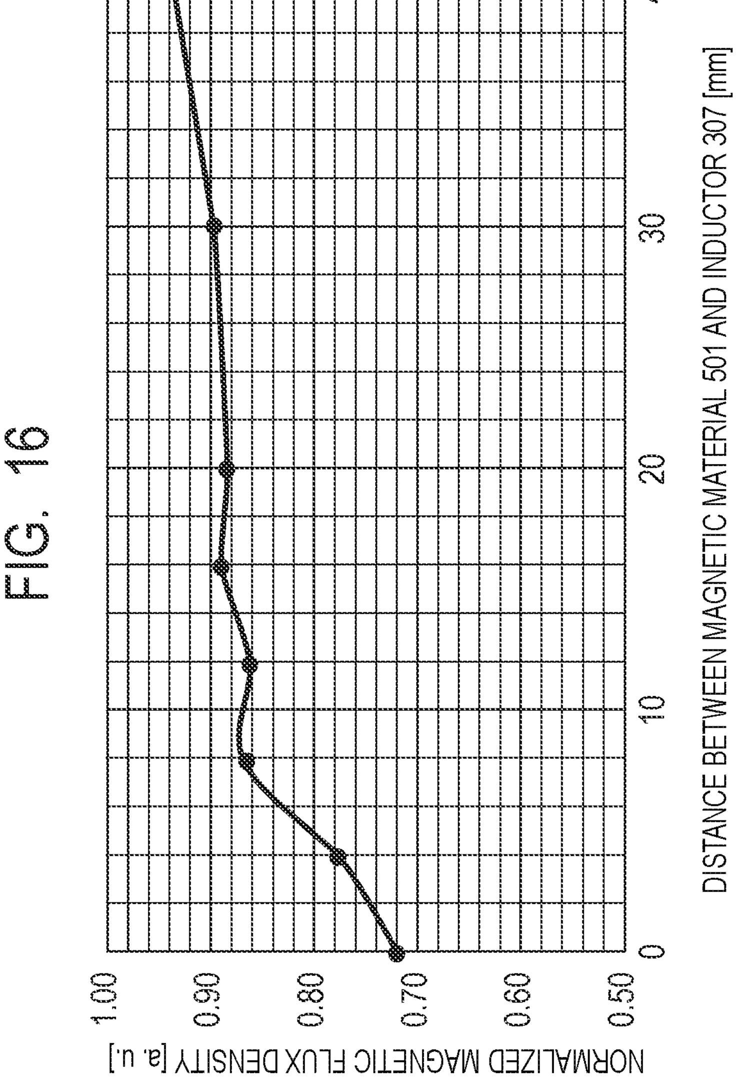
FIG. 16 is a graph illustrating a relationship between the distance between the magnetic member and the inductor and the normalized magnetic flux density.

FIG. 16 is a graph illustrating the normalized magnetic flux density of the magnetic field reaching the image sensor device 113 when the distance between the magnetic member 501 and the inductor 307 was changed in Example 1-2. It is found from FIG. 16 that, when the distance between the magnetic member 501 and the inductor 307 is 30 mm or less, a reduction effect by 10% or greater is obtained for the magnetic flux density.

Note that, although the result obtained when the frequency of switching operation of the control circuit 306 is 20 kHz is illustrated in the Examples described above, it was confirmed that the same effect is obtained even when the frequency is within a range of 10 kHz to 1 MHz.

Fourth Embodiment

An electric unit according to a fourth embodiment of the present invention will be described with reference to FIG. 17A to FIG. 19E.

Figure 17A:
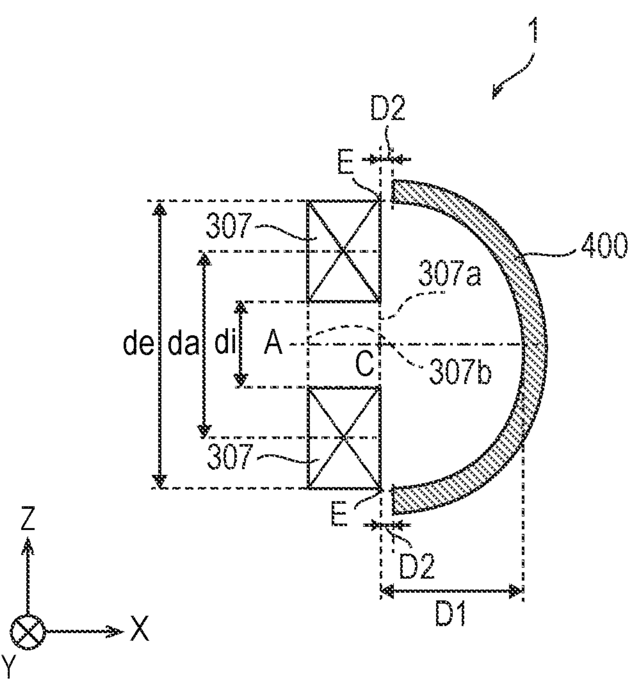
FIG. 17A is a schematic diagram illustrating an electric unit according to a fourth embodiment.
Figure 17B:
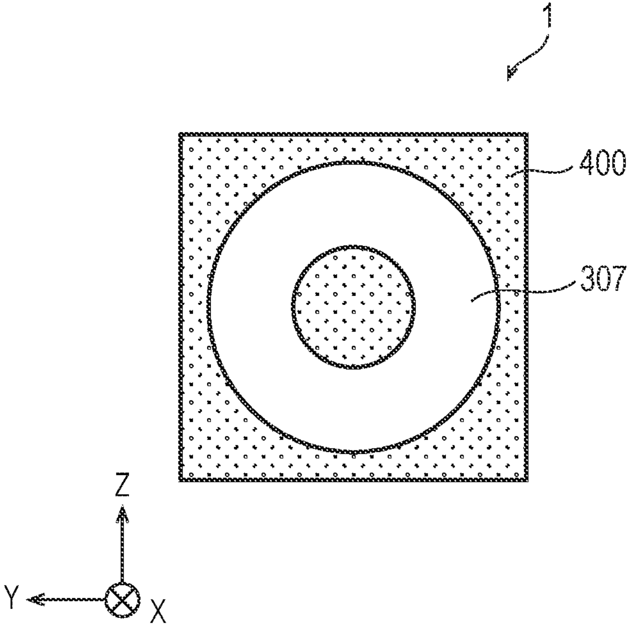
FIG. 17B is a schematic diagram illustrating the electric unit according to the fourth embodiment.

First, the structure of the electric unit according to the present embodiment will be described with reference to FIG. 17A and FIG. 17B. FIG. 17A is a sectional view illustrating the electric unit 1 according to the present embodiment. FIG. 17B is a front view illustrating the electric unit 1 according to the present embodiment. Note that FIG. 17A illustrates a cross section including a winding axis A of the inductor 307 described later of the electric unit 1, that is, illustrates a cross section of the center part of the inductor 307. Further, FIG. 17B is a front view illustrating the electric unit 1 when viewed from the inductor 307 side. FIG. 17A and FIG. 17B illustrate an XYZ coordinate system including an X-axis along the winding axis A described later, a Y-axis orthogonal to the X-axis, and a Z-axis orthogonal to the X-axis and the Y-axis.

As illustrated in FIG. 17A and FIG. 17B, the electric unit 1 according to the present embodiment has the inductor 307 and a nonmagnetic conductive member 400. The electric unit 1 according to the present embodiment can be used for a product such as an apparatus, a device, or the like having an electric circuit including the inductor 307. The product in which the electric unit 1 according to the present embodiment may be used is, for example, a flash emitting apparatus having a light emitting circuit, an interchangeable lens or an image stabilizing apparatus having a motor drive circuit, or the like, but is not particularly limited thereto.

The inductor 307 is formed such that a single continuous conductor wiring is wound in, for example, a circular cylindrical shape about the straight winding axis A. The inductor 307 has a first face 307*a* intersecting, for example, orthogonal to the winding axis A and a second face 307*b* intersecting, for example, orthogonal to the winding axis A at one end and the other end in the direction of the winding axis A, respectively. The conductor wiring used for the inductor 307 is, for example, a copper wire, but is not particularly limited thereto. The conductor wiring is coated with an insulator. The inductor 307 may be an air-core coil or may be a cored coil such as an open magnetic coil or a closed magnetic coil having a core. Note that, in the inductor 307, the shape around which the conductor wiring is wound is not limited to the circular cylindrical shape and may be any cylindrical shape having various sectional shapes.

The nonmagnetic conductive member 400 is made of a conductive metal such as copper, aluminum, steel, or the like and is specifically a plate member such as a copper plate, an aluminum plate, a steel plate, or the like. In terms of sufficient reduction of the magnetic field, the ratio of the thickness of the conductive member 400 to the skin depth of the conductive member 400 at a frequency of current flowing through the inductor 307 is preferably greater than or equal to 5%. The skin depth is the distance where an electromagnetic wave entering a material is attenuated to 1/e and is given by $1/\sqrt{(\pi \cdot f \cdot \mu \cdot \sigma)}$ [m], where the magnetic permeability of the material is $\mu$ [H/m], the electric conductivity of the material is $\sigma$ [S/m], and the frequency of the electromagnetic wave is f [Hz].

The conductive member 400 is arranged on the first face 307*a* side in the direction of the winding axis A with respect to the inductor 307. Note that the conductive member 400 is at least arranged on the first face 307*a* side in the direction of the winding axis A with respect to the inductor 307 and may be arranged on both the first face 307*a* side and the second face 307*b* side in the direction of the winding axis A.

As illustrated in FIG. 17A, the conductive member 400 is curved protruding to the opposite side of the inductor 307 so as to cover the inductor 307 in a cross section including the winding axis A of the electric unit 1. That is, in the cross section including the winding axis A, the distance D1 between the intersection of the winding axis A with the conductive member 400 and the center C of the inductor 307 is longer than the distance D2 between the intersection of a line extending parallel to the winding axis A at each of both ends E of the inductor 307 with the conductive member 400 and each of both the ends E. Herein, the center C of the inductor 307 is the center at the end on the conductive member 400 side of the inductor 307, which is an intersection of the winding axis A with the first face 307*a* of the inductor 307. Further, both ends E of the inductor 307 are both end points of the first face 307*a* of the inductor 307 in a cross section including the winding axis A.

Note that, in terms of suppressing the inductance reduction of the inductor 307 to a sufficiently small level, the distance D1 is preferably greater than or equal to the inner diameter of the inductor 307. The inner diameter of the inductor 307 is indicated by "di" in FIG. 17A. Further, the outer diameter and the average diameter described later of the inductor 307 are indicated by "de" and "da" in FIG. 17A, respectively.

Further, in terms of sufficiently reduce the radiation magnetic field generated from the inductor 307, the conductive member 400 preferably has a larger diameter than the outer diameter of the inductor 307. Note that the diameter of the conductive member 400 is the largest value of the distance across the conductive member 400 in a plane shape when viewed in the direction of the winding axis A of the inductor 307 and means the diameter when the plane shape of the conductive member 400 is circular.

Further, as illustrated in FIG. 17B, in planar view in the direction of the winding axis A, the conductive member 400 has a square plane shape which includes the inductor 307 having an annular plane shape and whose center matches the center of the inductor 307. Note that the plane shape of the conductive member 400 is not limited to the square shape illustrated in FIG. 17B and may be other shapes such as a rectangular shape other than a square shape, a circular shape, an elliptical shape, or the like.

Further, in the conductive member 400, a portion located inside the average diameter da of the inductor 307 in planar view in the direction of the winding axis A is preferably located at a position distant from the inductor 307 by the inner diameter di of the inductor 307 or more. This is a preferable positional relationship in terms of sufficiently suppressing an inductance reduction of the inductor 307. Further, in the conductive member 400, a portion located outside the average diameter da of the inductor 307 in planar view in the direction of the winding axis A is preferably located closer to the inductor 307 than the portion located inside the average diameter da in the planar view of interest in the direction of the winding axis A. This is a preferable positional relationship in terms of sufficiently reducing radiation magnetic field from the inductor 307. Note that the average diameter da of the inductor 307 is defined by da=(di+de)/2 by using the inner diameter di and the outer diameter de of the inductor.

In general, a radiation magnetic field generated from an inductor affects the operations of other apparatuses or other components in the same apparatus. In the electric unit 1 according to the present embodiment, the conductive member 400 has a shielding effect against a radiation magnetic field generated from the inductor 307. In the magnetic field shielding mechanism by a conductive member, a counter magnetic field occurs against only the magnetic field component perpendicularly entering the conductive member and attenuates the incident magnetic field. That is, when the magnetic field enters the conductive member perpendicularly, the magnetic field shielding effect increases. In contrast, when the magnetic field enters the conductive member parallel thereto, substantially no magnetic field shielding effect is exerted. Further, the conductive member exerts a larger shielding effect when located closer to the inductor that is a radiation source.

On the other hand, it is required for an inductor included in an electric circuit such as a drive circuit or the like to prevent an inductance reduction in order to ensure the operation of the electric circuit. A reduction in the inductance of an inductor included in an electric circuit may cause large current to flow in the electric circuit and result in malfunction of the electric circuit. When the current flowing through the inductor is constant, the inductance thereof is proportional to a magnetic flux density. Since the magnetic flux density at the center of the inductor is much larger than the magnetic flux density at both ends of the inductor, the inductance is generally determined by the magnetic flux density at the center of the inductor.

Figure 18A:
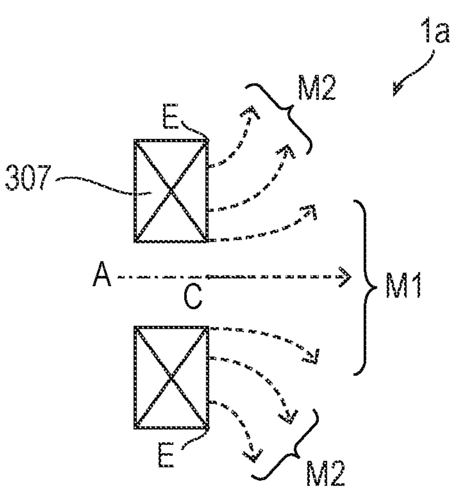
FIG. 18A is a schematic diagram illustrating paths of the magnetic field in an electric unit without a conductive member.
Figure 18B:
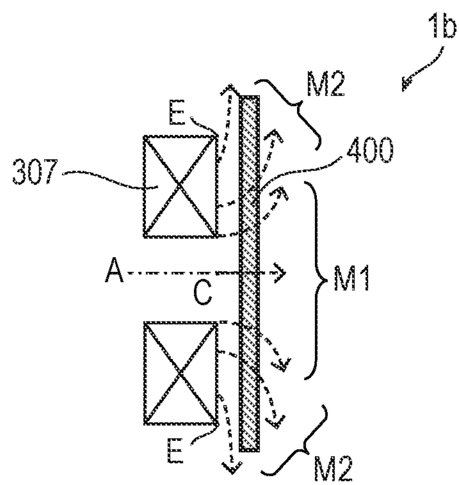
FIG. 18B is a schematic diagram illustrating paths of the magnetic field in an electric unit with a plate conductive member.
Figure 18C:
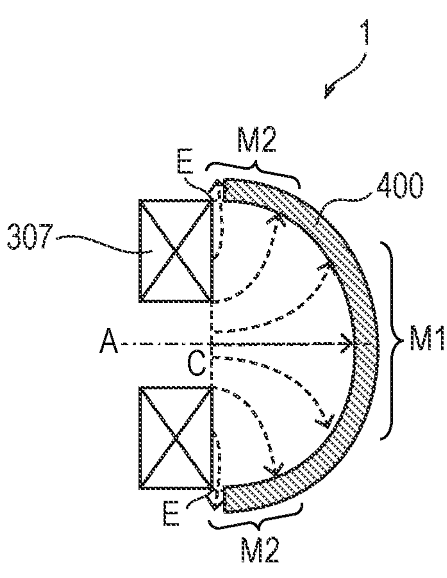
FIG. 18C is a schematic diagram illustrating paths of the magnetic field in the electric unit according to the fourth embodiment.

The paths of the magnetic field in the electric unit 1 according to the present embodiment will now be described with reference to FIG. 18A to FIG. 18C in comparison with a configuration without the conductive member 400 and a configuration with the plate conductive member 400. FIG. 18A to FIG. 18C illustrate cross sections corresponding to the cross sections including the winding axis A of the inductor 307 illustrated in FIG. 17A, respectively. Further, broken lines with arrows in FIG. 18A to FIG. 18C indicate paths of the radiation magnetic field emitted into space from the inductor 307. Note that, while a magnetic field is similarly emitted from the opposite side of the side indicated by the broken lines with arrows of the inductor 307, the illustration thereof is omitted. In the followings, the radiation magnetic field generated from the inductor 307 will be described with a magnetic field M1 in the center part of the inductor 307 including the center C and magnetic fields M2 around both ends of the inductor 307 including both the ends E, separately.

FIG. 18A is a sectional view illustrating paths of the magnetic field in an electric unit 1*a* having only the inductor 307 without the conductive member 400. The electric unit 1*a* illustrated in FIG. 18A is the same as the electric unit 1 according to the present embodiment except for not having the conductive member 400. In the case illustrated in FIG. 18A, the magnetic field M1 in the center part of the inductor 307 is emitted substantially parallel to the direction of the winding axis A near the inductor 307. On the other hand, in such a case, the magnetic fields M2 around both ends of the inductor 307 have larger angles relative to the direction of the winding axis A and are emitted substantially perpendicularly thereto around both the ends E. Since the intensity of the radiation magnetic field is proportional to the magnetic flux density, the magnetic field M1 in the center part of the inductor 307 is stronger than the magnetic fields M2 around both the ends of the inductor 307.

FIG. 18B is a sectional view illustrating paths of the magnetic field in an electric unit 1*b* with the inductor 307 being covered with the plate conductive member 400 as with Japanese Patent Application Laid-Open No. 2020-101753. The electric unit 1*b* illustrated in FIG. 18B is the same as the electric unit 1 according to the present embodiment except for the conductive member 400 being a plate. In the case illustrated in FIG. 18B, since the magnetic field M1 in the center part of the inductor 307 enters the plate conductive member 400 substantially perpendicularly, the shielding effect exerted by the conductive member 400 is large against the magnetic field M1 in the center part of the inductor 307. In such a case, however, as the magnetic flux density of the center part of the inductor 307 significantly decreases due to the counter magnetic field, the inductance of the inductor 307 will also decrease significantly. Further, in such a case, since the angle at which the magnetic fields M2 around both ends of the inductor 307 enter the conductive member 400 is closer to parallel, the shielding effect exerted by the conductive member 400 is smaller than that against the magnetic field M1 in the center part of the inductor 307.

FIG. 18C is a sectional view illustrating paths of the magnetic field in the electric unit 1 according to the present embodiment. In the present embodiment, the inductor 307 is covered with the curved conductive member 400 as described above. In the case illustrated in FIG. 18C, since the magnetic fields M2 around both ends of the inductor 307 enters substantially perpendicularly the conductive member 400, the shielding effect exerted by the conductive member 400 against the magnetic fields M2 around both ends of the inductor 307 is larger than that in the case illustrated in FIG. 18B. Further, in such a case, because of a large distance between the center C of the inductor 307 and the intersection of the winding axis A with the conductive member 400, the shielding effect exerted by the conductive member 400 against the magnetic field M1 in the center part of the inductor 307 is smaller than that in the case illustrated in FIG. 18B. Further, in such a case, since a reduction in the magnetic flux density in the center part of the inductor 307 due to the counter magnetic field is suppressed to be smaller than that in the case illustrated in FIG. 18B, an inductance reduction of the inductor 307 due to the conductive member 400 is also small. That is, in the present embodiment, an increase in the shielding effect against the magnetic fields M2 around both ends of the inductor 307 and a reduction in the shielding effect against the magnetic field M1 in the center part of the inductor 307 are combined. Accordingly, in the present embodiment, it is possible to suppress an inductance reduction of the inductor 307 to a small level or prevent the same while reducing a radiation magnetic field generated from the inductor 307.

Figure 19A:
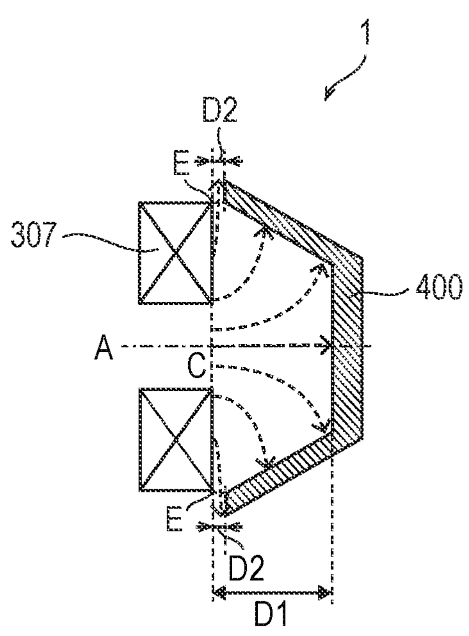
FIG. 19A is a schematic diagram illustrating a modified example of the conductive member in the electric unit according to the fourth embodiment.
Figure 19B:
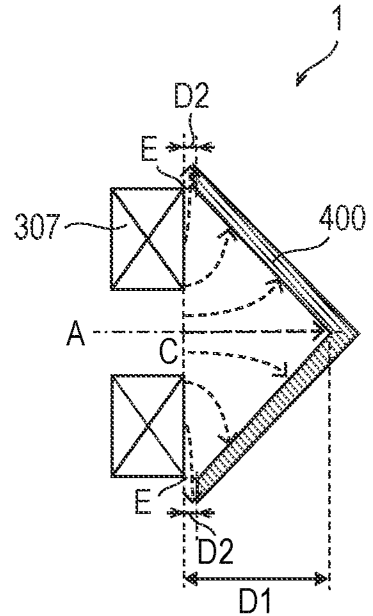
FIG. 19B is a schematic diagram illustrating a modified example of the conductive member in the electric unit according to the fourth embodiment.
Figure 19C:
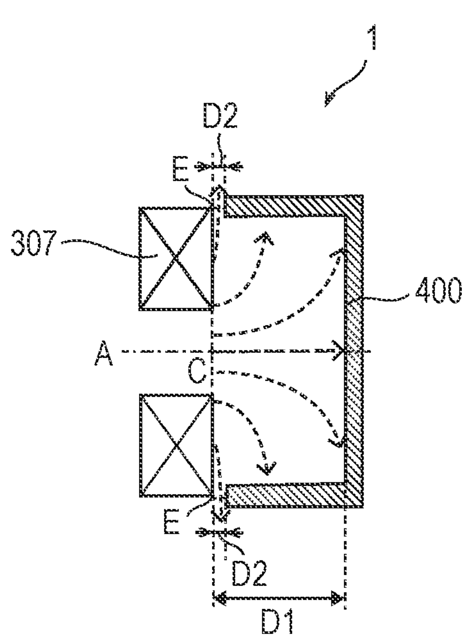
FIG. 19C is a schematic diagram illustrating a modified example of the conductive member in the electric unit according to the fourth embodiment.
Figure 19D:
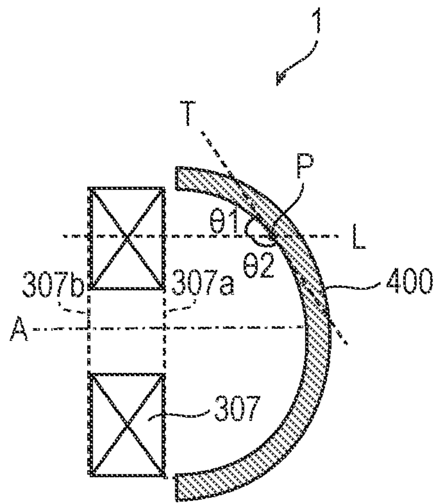
FIG. 19D is a schematic diagram illustrating one of preferable conditions about curvature or bending of the conductive member in the electric unit according to the fourth embodiment.
Figure 19E:
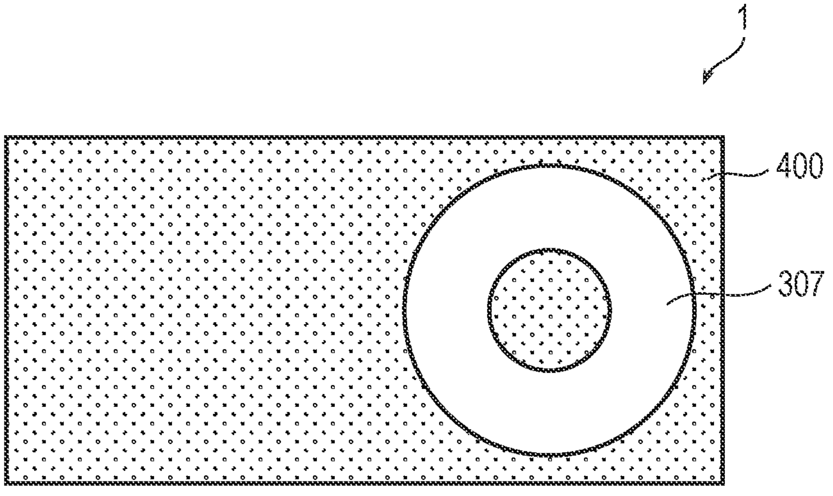
FIG. 19E is a schematic diagram illustrating a modified example of the conductive member in the electric unit according to the fourth embodiment.

Note that the shape of the conductive member 400 is not limited to the shape illustrated in FIG. 17A and FIG. 17B and may be other shapes. FIG. 19A to FIG. 19C are sectional views illustrating modified examples of the sectional shape of the conductive member 400 in the electric unit 1. FIG. 19D is a sectional view illustrating one of preferable conditions about curvature or bending of the conductive member 400. FIG. 19E is a plan view illustrating a modified example of the plane shape of the conductive member 400 in the electric unit 1.

In the case illustrated in FIG. 17A, the conductive member 400 is formed of a curved portion in the cross section including the winding axis A of the electric unit 1. In contrast, as illustrated in FIG. 19A to FIG. 19C, the conductive member 400 may be bent so as to be folded at a single position or multiple positions to protrude to the opposite side of the inductor 307 so as to cover the inductor 307 in the cross section including the winding axis A of the electric unit 1.

In all the cases of FIG. 19A to FIG. 19C, the relationship between the distance D1 and the distance D2 described above is satisfied. That is, in all the cases, in the cross section including the winding axis A, the distance D1 between the intersection of the winding axis A with the conductive member 400 and the center C of the inductor 307 is longer than the distance D2 between the intersection of a line extending parallel to the winding axis A at each of both the ends E of the inductor 307 with the conductive member 400 and each of both the ends E. Further, in all the cases, the distance D1 is preferably greater than or equal to the inner diameter di of the inductor 307, and the conductive member 400 preferably has a larger diameter than the outer diameter of the inductor 307.

In particular, in the cases illustrated in FIG. 19A and FIG. 19B, the conductive member 400 has a portion angled relative to the direction orthogonal to the direction of the winding axis A in the cross section including the winding axis A of the electric unit 1. Further, in the case illustrated in FIG. 19A, in the cross section of interest, the conductive member 400 has a portion parallel to the direction orthogonal to the direction of the winding axis A and a portion angled relative to the direction orthogonal to the direction of the winding axis A. In such a way, the conductive member 400 can take various shapes.

As illustrated in FIG. 19D, in the cross section of the electric unit 1 including the winding axis A, a line extending parallel to the winding axis A at a point P is denoted as L, where the point P is one point on the conductive member 400 between the center of the conductive member 400 and the outer end of the conductive member 400 in the direction along the first face 307*a*. Further, in the cross section of the electric unit 1 including the winding axis A, angles of the conductive member 400 relative to the line L on the inductor 307 side with respect to the conductive member 400 are denoted as θ1 and θ2. Herein, the angle of the conductive member 400 relative to the line L is an angle of the conductive member 400 relative to the line L in a case of the straight conductive member 400 in the cross section of interest or is an angle of the tangent T at the point P on the conductive member 400 relative to the line L in a case of the conductive member 400 curved at the point P in the cross section of interest. The conductive member 400 is preferably curved or bent so as to include the point P that is a portion where the angles θ1 and θ2 are an acute angle or an obtuse angle between the center of the conductive member 400 in the cross section of the electric unit 1 including the winding axis A and the outer end of the conductive member 400 in the direction along the first face 307*a*. Because the conductive member 400 is curved or bent in such a way, both the reduction in the radiation magnetic field and the suppression of an inductance reduction can be effectively achieved.

Further, as illustrated in FIG. 19E, by increasing the area of the conductive member 400, it is also possible to increase the range that enables shielding against a radiation magnetic field generated from the inductor 307. The conductive member 400 is at least arranged so as to include the inductor 307 in planar view when viewed in the direction of the winding axis A of the inductor 307 and may be arranged point-symmetrically or line-symmetrically with respect to the inductor 307 or may be arranged asymmetrically.

Fifth Embodiment

Figure 20:
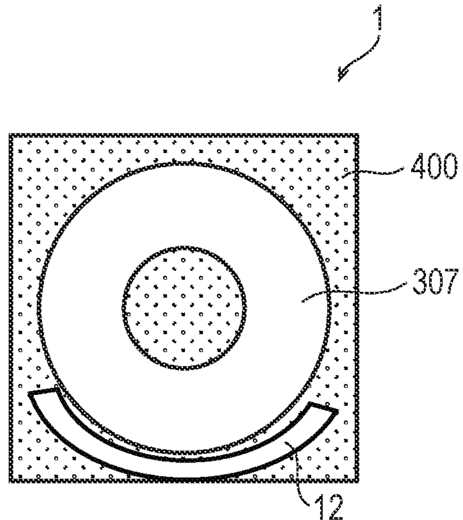
FIG. 20 is a schematic diagram illustrating an electric unit according to a fifth embodiment.

An electric unit 1 according to a fifth embodiment of the present invention will be described with reference to FIG. 20. FIG. 20 is a front view illustrating the electric unit 1 according to the present embodiment. Note that the same components as those of the above fourth embodiment will be labeled with the same references, and the description thereof will be omitted or simplified.

As illustrated in FIG. 20, the electric unit 1 according to the present embodiment further has a magnetic member 12 in addition to the configuration in accordance with the fourth embodiment. The magnetic member 12 is arranged adjacent to the side face of the inductor 307 between the first face 307*a* and the second face 307*b*. Because the magnetic member 12 is arranged adjacent to the side face of the inductor 307, the magnetic field generated from the inductor 307 and leaked out of a clearance between the inductor 307 and the conductive member 400 is attracted to the magnetic member 12. Accordingly, in the present embodiment, it is possible to further reduce the radiation magnetic field generated from the inductor 307. In particular, the magnetic member 12 is preferably arranged so as to cover and surround a part or the whole of the side face of the inductor 307. Because a part or the whole of the side face of the inductor 307 is surrounded by the magnetic member 12, the reduction effect on the radiation magnetic field can be improved. Note that, while not particularly limited, the magnetic member 12 is specifically made of a magnetic material such as permalloy, amorphous alloys, FINEMET (registered trademark), or the like.

Sixth Embodiment

A light emitting apparatus, an imaging apparatus, an imaging system, and an imaging method according to a sixth embodiment of the present invention will be described with reference to FIG. 21A to FIG. 25B. Note that the same components as those of the above first to fifth embodiments will be labeled with the same references, and the description thereof will be omitted or simplified. In the present embodiment, the light emitting apparatus will be described with an example of a flash emitting apparatus configured to emit flashes and having a flash discharge tube as a light emitting component. Note that the present invention is not limited to flash emitting apparatuses and can be widely applied to light emitting apparatuses configured to emit light.

First, the imaging system according to the present embodiment will be described with reference to FIG. 21A to FIG. 22. In the present embodiment, an example of an imaging system 20 when the electric unit 1 according to the fourth embodiment is applied to the inductor 307 in the flash emitting apparatus 100 will be described.

Figure 21A:
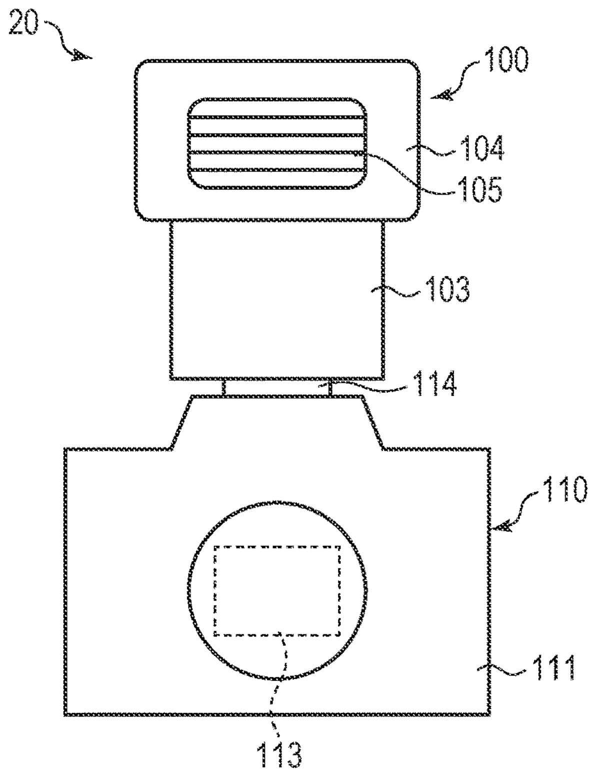
FIG. 21A is a schematic diagram illustrating a clip-on state of a flash emitting apparatus according to a sixth embodiment.
Figure 21B:
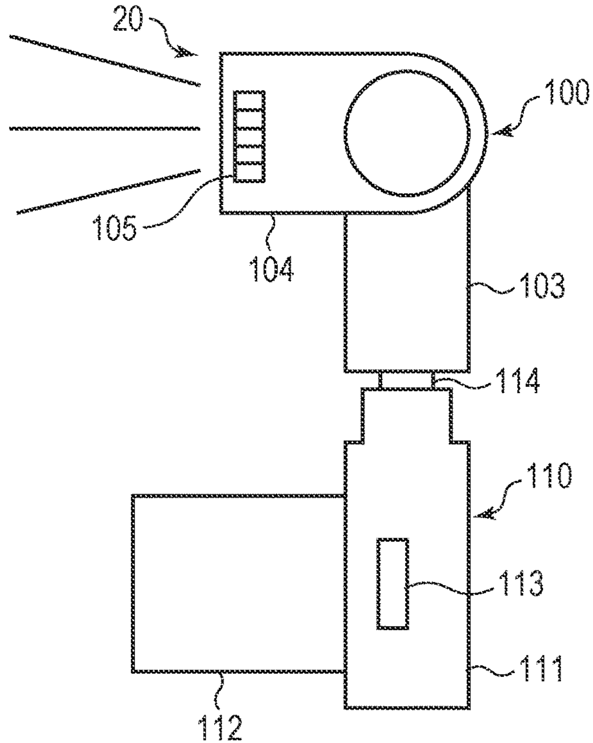
FIG. 21B is a schematic diagram illustrating the clip-on state of the flash emitting apparatus according to the sixth embodiment.

FIG. 21A and FIG. 21B are schematic diagrams illustrating a clip-on state of a flash emitting apparatus 100 and an imaging apparatus 110 included in an imaging system 20. FIG. 20 is a schematic diagram illustrating a bracket state of the flash emitting apparatus 100 and the imaging apparatus 110 included in the imaging system 20. As illustrated in FIG. 21A to FIG. 22, the imaging system 20 includes the flash emitting apparatus 100 and the imaging apparatus 110.

The imaging system 20 in which the flash emitting apparatus 100 and the imaging apparatus 110 are in the clip-on state will be first described with reference to FIG. 21A and FIG. 21B. FIG. 21A is a front view illustrating the flash emitting apparatus 100 and the imaging apparatus 110 in the clip-on state, and FIG. 21B is a side view illustrating the flash emitting apparatus 100 and the imaging apparatus 110 in the clip-on state.

As illustrated in FIG. 21A and FIG. 21B, the flash emitting apparatus 100 has a first casing 103, a second casing 104, and a flash discharge tube 105 that is a light emitting component. The first casing 103 is equipped with a battery, a power supply circuit, or the like (not illustrated) for supplying power to the flash emitting apparatus 100. The flash discharge tube 105 is provided to the second casing 104. The second casing 104 has a rotary mechanism and is provided to the first casing 103 rotatably by the rotary mechanism. Accordingly, the second casing 104 is configured such that the second casing 104 can be rotated to change the orientation of light emission from the flash discharge tube 105.

The imaging apparatus 110 has a casing 111, an interchangeable lens 112, an image sensor device 113, and an accessory shoe 114. The interchangeable lens 112 is configured to be detachable from the casing 111. The image sensor device 113 is provided to the casing 111. The image sensor device 113 is not particularly limited and is an image sensor such as a complementary metal-oxide semiconductor (CMOS) sensor, for example. The interchangeable lens 112 converges or diverges light from a subject to form a subject image on the image sensor device 113. The image sensor device 113 has arrayed photoelectric conversion elements that convert light from the interchangeable lens 112 into electric signals. The accessory shoe 114 is a hot shoe and is provided externally such as on the top of the casing 111 or the like.

For example, the imaging apparatus 110 has a rolling shutter implemented by the image sensor device 113 as an electronic shutter. Further, for example, the imaging apparatus 110 may have a focal plane shutter having a front curtain and a rear curtain as a mechanical shutter upstream of the image sensor device 113. The imaging apparatus 110 can implement a high-speed shutter by the electronic shutter.

The flash emitting apparatus 100 is electrically and physically connected to the imaging apparatus 110 via the accessory shoe 114 and fixed to the imaging apparatus 110. In the flash emitting apparatus 100, light emission is controlled by a signal input from the imaging apparatus 110 via the accessory shoe 114. The flash discharge tube 105 emits light in accordance with a signal from the imaging apparatus 110 and irradiates a subject (not illustrated) with light. As illustrated in FIG. 21A and FIG. 21B, the state where the flash emitting apparatus 100 is arranged on the accessory shoe 114 of the imaging apparatus 110 is referred to as a clip-on state.

Next, the imaging system 20 in which the flash emitting apparatus 100 and the imaging apparatus 110 are in a bracket state will be described with reference to FIG. 22. FIG. 22 is a front view illustrating the flash emitting apparatus 100 and the imaging apparatus 110 are in the bracket state.

Figure 22:
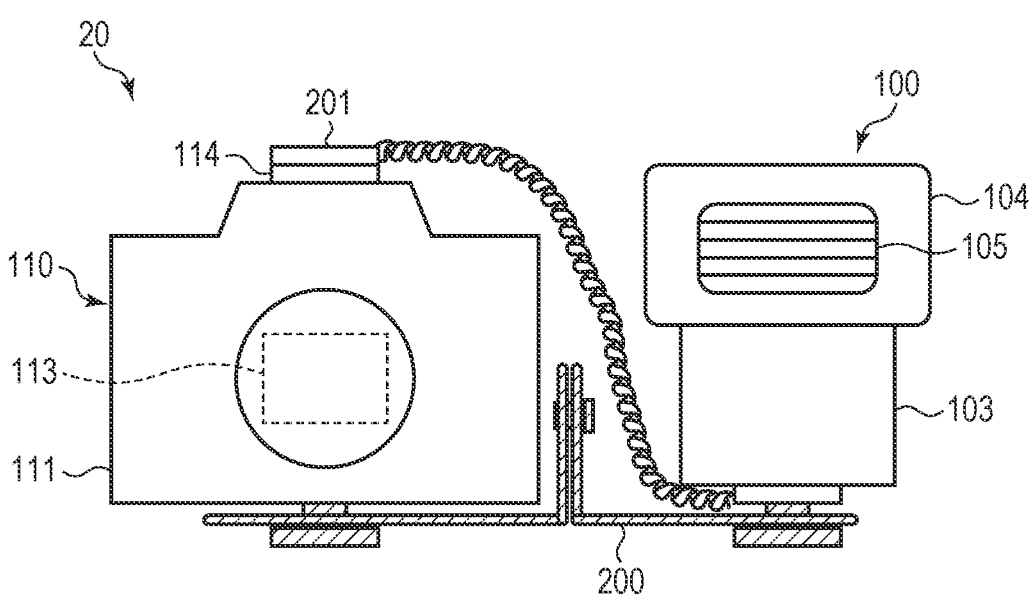
FIG. 22 is a schematic diagram illustrating a bracket-state of the flash emitting apparatus according to the sixth embodiment.

As illustrated in FIG. 22, the flash emitting apparatus 100 having the configuration described above is arranged in the side face direction of the imaging apparatus 110 having the configuration described above. The imaging apparatus 110 and the flash emitting apparatus 100 are coupled to each other by a bracket 200. The bracket 200 is a jig for fixing the imaging apparatus 110 and the flash emitting apparatus 100 thereto that are arranged in their side face directions. Further, the flash emitting apparatus 100 is electrically connected to the imaging apparatus 110 by an off-camera shoe cord 201. The off-camera shoe cord 201 is a cable for connecting the flash emitting apparatus 100 to the accessory shoe 114. As illustrated in FIG. 22, a state where the imaging apparatus 110 and the flash emitting apparatus 100 are arranged in their lateral directions is referred to as a bracket state.

In the imaging system 20, the flash emitting apparatus 100 and the imaging apparatus 110 can be brought into the clip-on state and also brought into the bracket state in accordance with the purpose of image capturing, the situation of image capturing, or the like. Note that the flash emitting apparatus 100 and the imaging apparatus 110 may be arranged in a state other than the clip-on state and the bracket state.

Figure 23:
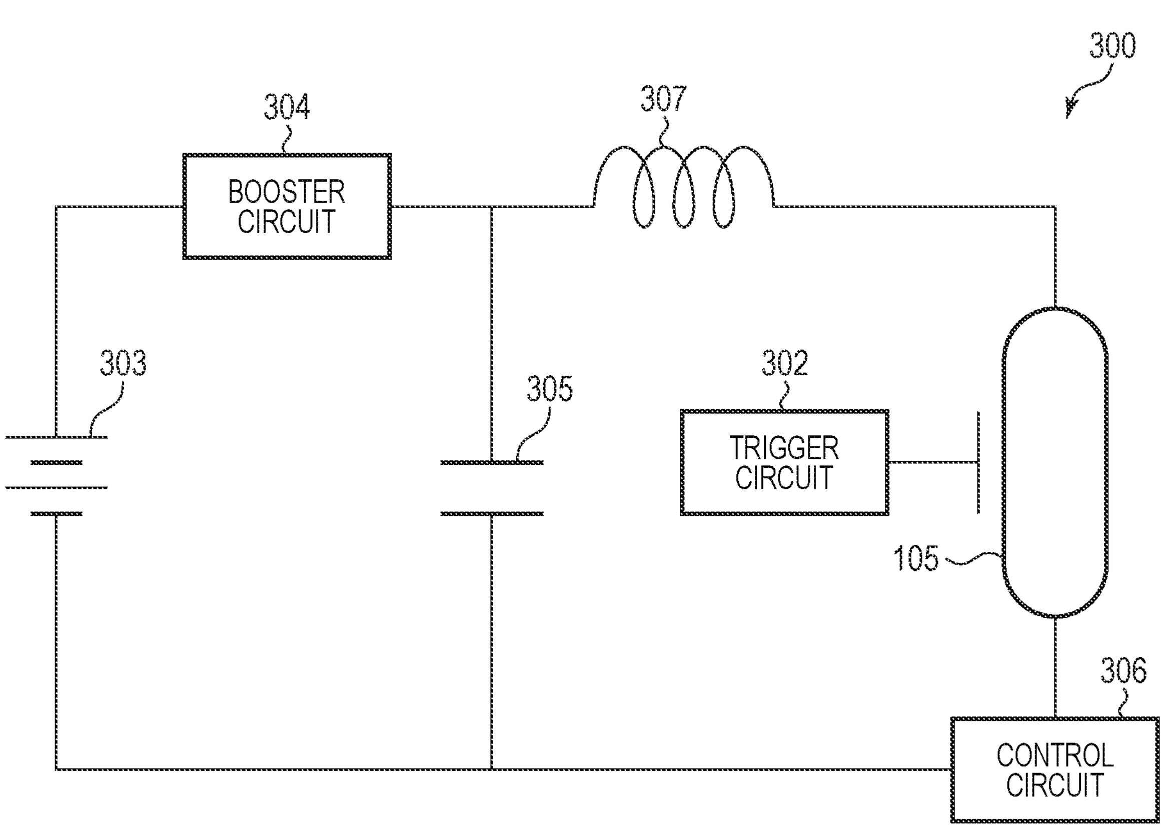
FIG. 23 is a block diagram illustrating a light emitting circuit in the flash emitting apparatus according to the sixth embodiment.

Next, the configuration of the flash emitting apparatus 100 will be described with reference to FIG. 23. FIG. 23 is a block diagram illustrating an electric circuit 300 of the flash emitting apparatus 100.

As illustrated in FIG. 23, the electric circuit 300 in the flash emitting apparatus 100 includes the flash discharge tube 105, a trigger circuit 302, a power supply 303, a booster circuit 304, a capacitor 305, a control circuit 306, and an inductor 307. The power supply 303 is connected to the input terminal of the booster circuit 304. The output terminal of the booster circuit 304 is connected to one end of the inductor 307. One end of the capacitor 305 is connected between the booster circuit 304 and the inductor 307 so that charges from the booster circuit 304 can be accumulated. The other end of the inductor 307 is connected to one end electrode of the flash discharge tube 105. The control circuit 306 is connected to the other end electrode of the flash discharge tube 105. Further, the trigger circuit 302 is arranged to the flash discharge tube 105 so that a pulsed voltage can be applied to the flash discharge tube 105.

The flash discharge tube 105 is a light emitting component having a glass tube made of quartz, high silica, or the like in which a rare gas such as xenon is sealed and whose both ends are provided with electrodes and sealed. Note that the light emitting component used for the flash emitting apparatus 100 can be selected from light sources with incandescent luminescence, discharge luminescence, electroluminescence, photoluminescence, and the like and is preferably the flash discharge tube 105 such as a xenon lamp, however, may be a solid light emitting component such as a light emitting diode. The trigger circuit 302 is a circuit that applies a pulsed voltage that ignites the flash discharge tube 105 to the flash discharge tube 105 via an ignition electrode and is formed of a transformer or the like. The power supply 303 is a power supply of, for example, about several volts to 10 volts for supplying power to the flash discharge tube 105 and is specifically a lithium-ion battery, a nickel-metal hydride battery, or the like. The booster circuit 304 is a circuit for converting the voltage of the power supply 303 into about several hundred volts and is formed of a DC/DC converter or the like. The capacitor 305 is a capacitor for accumulating charges supplied from the booster circuit 304, and an electrolytic capacitor for flashes that is adapted to instantaneous discharge is used in general. The capacitor 305 supplies the flash discharge tube 105 with power for causing the flash discharge tube 105 to emit light in accordance with accumulated charges. The control circuit 306 is a circuit that controls the amount of current flowing through the flash discharge tube 105 and is formed of a switching element such as an insulated gate bipolar transistor (IGBT) element. The control circuit 306 controls power supplied from the capacitor 305 to the flash discharge tube 105 via switching operation. The control circuit 306 can perform the switching operation at an operation frequency of 10 kHz to 1 MHz, for example. The inductor 307 electrically connected between the capacitor 305 and the flash discharge tube 105 is used for limiting current supplied from the capacitor 305 to the flash discharge tube 105. The inductor 307 may be a cored coil having a core or may be an air-core coil having no core and is often the air-core coil.

Next, the operation of the flash emitting apparatus 100 will be described with reference to FIG. 23.

First, in response to a signal input from the imaging apparatus 110, the power supply 303 supplies power to the booster circuit 304, and the booster circuit 304 starts operation to boost and output the voltage. Once the booster circuit 304 starts the operation, charges are supplied to the capacitor 305 to start charging of the capacitor 305. Once the charged voltage of the capacitor 305 reaches a voltage required for light emission, the flash emitting apparatus 100 turns on an indicator thereof (not illustrated) to display that light emission is ready.

Next, once the photographer releases the shutter of the imaging apparatus 110, a signal for ignition is delivered to the flash emitting apparatus 100 from the imaging apparatus 110 via the accessory shoe 114. In the flash emitting apparatus 100 that has received the signal, the trigger circuit 302 applies a high-voltage pulse as a pulsed voltage to the flash discharge tube 105. This high-voltage pulse ionizes the gas inside the flash discharge tube 105, and this ionization lowers the impedance inside the flash discharge tube 105. In response, charges in the capacitor 305 starts being discharged through the flash discharge tube 105. At this time, the inductor 307 limits the current caused by discharge of charges from the capacitor 305 and suppresses a rapid increase of the current. Further, the control circuit 306 performs switching-on/off operation based on information from an optical feedback circuit or the like (not illustrated) to control the current so that the current flowing through the flash discharge tube 105 is at a desired current value. Accordingly, the flash emitting apparatus 100 emits a flash by discharge through the flash discharge tube 105.

Note that the flash emitting apparatus 100 can operate in a flash emission mode (single-emission mode) and can also operate in a focal plane emission mode (continual-emission mode). The flash emission mode is a mode to emit a flash once in a shutter operation. The focal plane emission mode is a mode to emit multiple times of flashes repeatedly, continually in a shutter operation.

When the flash emitting apparatus 100 emits light, significantly large current flows in the electric circuit 300. Specifically, the current flowing through the electric circuit 300 amounts several hundred amperes in the flash emission mode and amounts several ten amperes even in the focal plane emission mode. In particular, the mode that suffers from occurrence of noise in an image during a fast-speed shutter is the focal plane emission mode. This mode applies continual light emission where the control circuit 306 repeats switching on and off of current of several ten amperes. The frequency of the repetition is about several ten kHz when an IGBT element is used in the control circuit 306 or about several MHz when a gallium nitride (GaN) element or a silicon carbide (SiC) element, which has been attracting attention recently, is used. A flow of such current through the inductor 307 will cause a large magnetic field to occur around the inductor 307 due to electromagnetic induction. When such a magnetic field reaches the image sensor device 113, stripe-like noise occurs as image noise in a captured image.

The mechanism of occurrence of such image noise will be described with reference to FIG. 24A and FIG. 24B together with operations in cases of a slow-speed shutter and a fast-speed shutter, which suffers from image noise, in the imaging apparatus 110. The flash emitting apparatus 100 emits light in the flash emission mode in a case of the slow-speed shutter and emits light in the focal plane emission mode in cases of the fast-speed shutter. Note that the slow-speed shutter in such a case means a shutter speed below the flash coordination speed (about $1/125$ to $1/250$ seconds in general). Furthermore, the fast-speed shutter means a case where a shutter is mainly used at a shutter speed above the flash coordination speed.

Figures 24A, 24B:
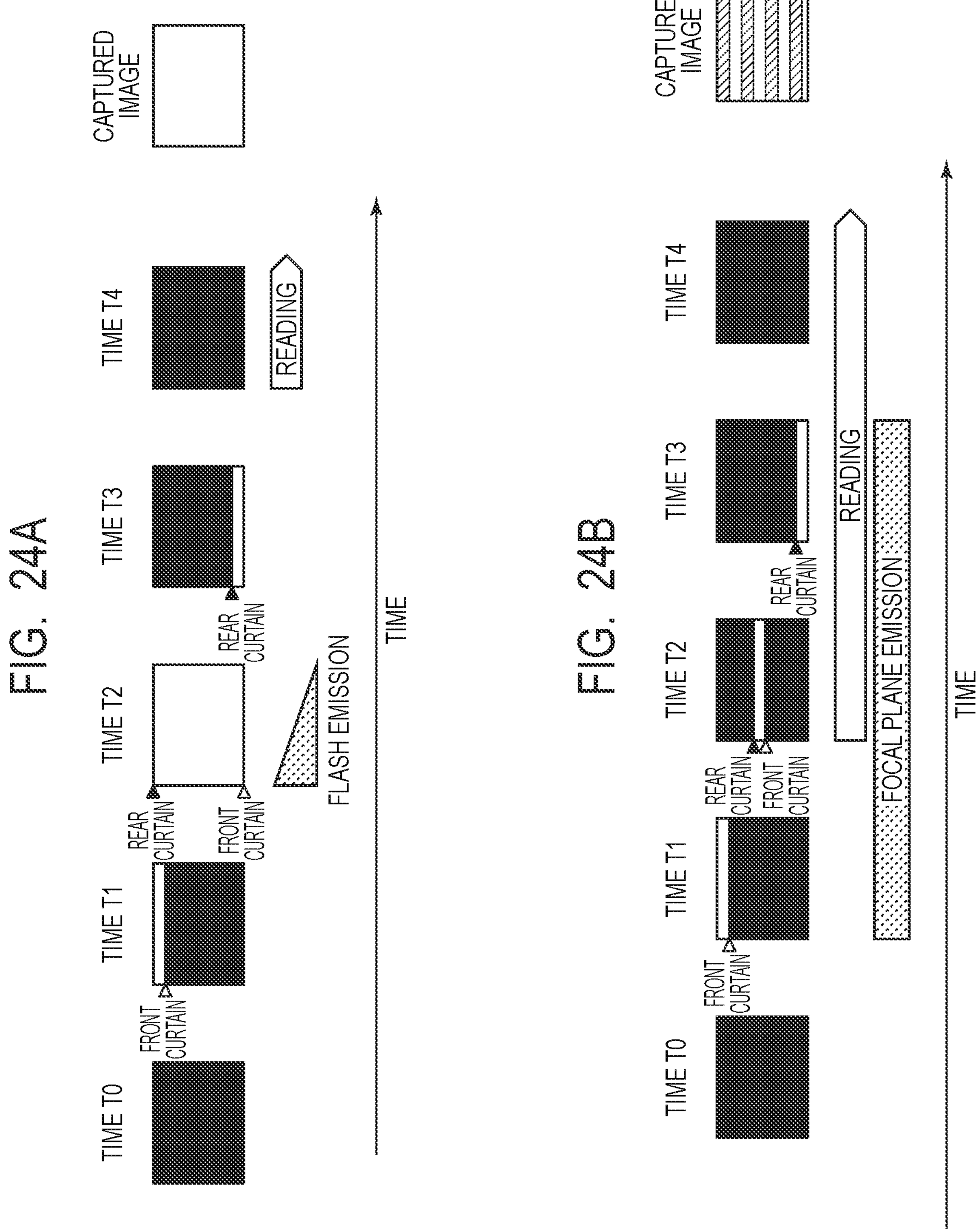
FIG. 24A is a schematic diagram illustrating an operation at a shutter speed of the flash emitting apparatus according to the sixth embodiment.
FIG. 24B is a schematic diagram illustrating an operation at a shutter speed of the flash emitting apparatus according to the sixth embodiment.

FIG. 24A illustrates the exposure state of the image sensor device 113, the reading timing of an image signal from the image sensor device 113, and the light emission timing of the flash emitting apparatus 100 in a case of light emission with the slow-speed shutter and the flash emission mode. FIG. 24B illustrates the exposure state of the image sensor device 113, the reading timing of an image signal of the image sensor device 113, and the light emission timing of the flash emitting apparatus 100 in a case of light emission with the fast-speed shutter, which suffers from image noise, and the focal plane emission mode. Further, each diagram of FIG. 24A and FIG. 24B illustrates the state of the image sensor device 113 in a time course from time t0 to time t4 and illustrates a view of a final captured image taken by the imaging apparatus 110 on the right of the time course. As for the state of the image sensor device 113, a light-shielded state is illustrated in black, and an exposed state is illustrated in white. Note that, although the same symbols t0 to t4 are used as symbols indicating the times for the slow-speed shutter and the fast-speed shutter, these symbols do not indicate the same time for respective shutter speeds and indicate different times in accordance with a shutter speed. For example, time t4 in FIG. 24B is earlier than time t4 in FIG. 24A by the difference in the shutter speed.

First, the case of the slow-speed shutter illustrated in FIG. 24A will be described. In this case, once the shutter button for activating the shutter of the imaging apparatus 110 is pressed at time to, the front curtain of the shutter is lowered at time t1, and exposure is started from the top of the image sensor device 113. Next, at time t2, while the front curtain of the shutter is in a completely lowered state, the rear curtain of the shutter has not yet started the operation. Thus, the image sensor device 113 is in a state where the entire image capturing region is exposed. Further, at the same time t2, the flash emitting apparatus 100 emits light in the flash emission mode, and the subject is irradiated with light at this time t2. The rear curtain is then gradually lowered, only the lower part of the image capturing region of the image sensor device 113 is exposed at time t3, and the exposure ends at time t4. Then, reading of an image signal that is an electrical signal photoelectrically converted from the image sensor device 113 is performed at and after time t4. A situation where the image sensor device 113 is irradiated with magnetic field noise and image noise thus occurs is caused by a case where magnetic field noise occurs in a reading period for an image signal. In the case illustrated in FIG. 24A, since the magnetic field noise at the time of light emission in the flash emission mode of the flash emitting apparatus 100 occurs at a time shifted from the reading period, the image noise, which would otherwise occur due to light emission of the flash emitting apparatus 100, does not occur.

Next, the case of the fast-speed shutter illustrated in FIG. 24B will be described. Also in this case, once the shutter button for activating the shutter of the imaging apparatus 110 is pressed at time t0, the front curtain of the shutter is lowered at time t1, and exposure is started from the top of the image sensor device 113. Then, since it is required to shorten the exposure time because of a faster shutter speed than in the case illustrated in FIG. 24A, the rear curtain of the shutter starts being lowered before the front curtain of the shutter has been completely lowered. Therefore, at time t2, only a part of the image sensor device 113 exposed between the front curtain and the rear curtain is exposed. In this state, exposure is sequentially performed toward the lower part of the image sensor device 113, only the lower part is exposed at time t3, and the exposure performed by the image sensor device 113 is completed at time t4. Reading of an image signal performed by the image sensor device 113 is started from time t4. At this time, the flash emitting apparatus 100 continually, repeatedly performs emission of flashes during the exposure period from time t1 to time t3. This is because of the following reason. Since the exposure region on the image sensor device 113 is limited to a part of the image capturing region in the fast-speed shutter, an unnatural image will be resulted if the subject is not irradiated with uniform light for respective regions. In such a way, repetition of emission of continual flashes performed by the flash emitting apparatus 100 during the entire exposure period is referred to as focal plane emission.

The reading is started from time t2 in an emission period of focal plane emission in the case of the fast-speed shutter. This is because of the following reason. Since the shutter speed is fast in the case of the fast-speed shutter, it is required to start reading of an image signal at a position where exposure has completed so far after start of the exposure. In particular, when an electronic shutter is used, it is required to perform reading after every exposure due to the operation system of the image sensor device 113. Herein, at time t2 and time t3, it can be seen that focal plane emission by the flash emitting apparatus 100 and reading of an image signal from the image sensor device 113 are performed at the same time. In such a case, if magnetic field noise occurring from the inductor 307 due to light emission reaches the image sensor device 113 during a reading period for an image signal from the image sensor device 113, stripe-like image noise will occur in a captured image.

As described previously, the current flowing through the inductor 307 in focal plane emission amounts several ten amperes, and the frequency thereof is about several ten kHz when an IGBT element is used in the control circuit 306. Thus, the inductor used as the inductor 307 is often an air-core coil having no magnetic member as the core member. This is because of the following reason. That is, when the inductor as the inductor 307 is a cored coil having a magnetic member as the core member, a magnetic field caused by current exceeding a certain amount flowing through the inductor can exceed the maximum magnetic flux density of the magnetic member because of the magnetic saturation property of the magnetic member. When the maximum magnetic flux density is exceeded, the inductance of the inductor 307 rapidly decreases. Such a rapid decrease of the inductance causes larger current to flow, and this may lead to an operation malfunction of the electric circuit 300. To prevent this, many types of cores having a fine gap provided in the magnetic member are available. However, it is required to provide a wide gap in the core for the case of large current as with the flash emitting apparatus 100, and the magnetic field may leak out of such a gap.

Further, when an air-core coil is used as the inductor 307, it is conceivable to cover the air-core coil with a conductive member without magnetic saturation in order to reduce the magnetic field leaking out of the air-core coil. However, since large current flows through the inductor 307 as described above, heat is generated due to the resistance component of the inductor 307, and this makes it difficult to completely seal the air-core coil. In such a case, while it is required to provide a clearance for heat dissipation, a magnetic field is emitted out of this clearance, and this magnetic field may cause noise in the captured image.

Figure 25A:
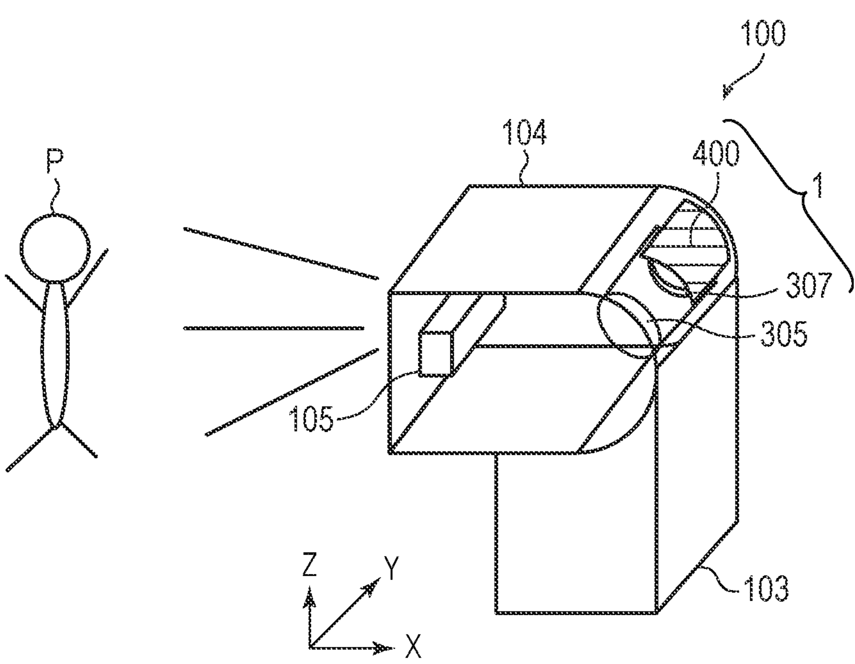
FIG. 25A is a schematic diagram illustrating the flash emitting apparatus according to the sixth embodiment.

Since the electric unit 1 according to the fourth embodiment used in the flash emitting apparatus 100 further has the conductive member 400 in order to reduce the magnetic field generated at the inductor 307 and reaching the image sensor device 113 as described above and thereby reduce noise occurring in a captured image due to the magnetic field. The structure of the flash emitting apparatus 100 including the electric unit 1 according to the fourth embodiment will be described below with reference to FIG. 25A and FIG. 25B. FIG. 25A is a perspective view illustrating the structure of the flash emitting apparatus 100 according to the present embodiment.

Figure 25B:
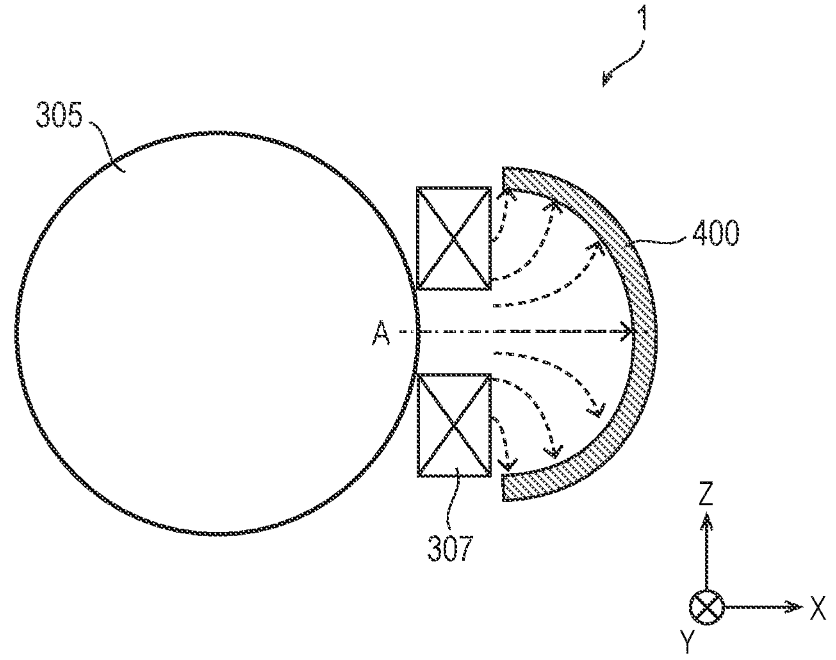
FIG. 25B is a schematic diagram illustrating the flash emitting apparatus according to the sixth embodiment.

FIG. 25A illustrates the XYZ coordinates having a Y-axis parallel to the longitudinal direction of the flash discharge tube 105 and a Z-axis orthogonal thereto, which form a YZ plane parallel to the light emission plane of the second casing 104 out of which light is emitted from the flash discharge tube 105 toward a subject P, and an X-axis orthogonal to the YZ plane. FIG. 25B is a sectional view of the capacitor 305, the inductor 307, and the conductive member 400 illustrated in FIG. 25A, which illustrates a cross section including the winding axis A of the inductor 307 when viewed in the Y direction. As illustrated in FIG. 25A, the electric unit 1 including the inductor 307 and the conductive member 400 is arranged on the rear side of the capacitor 305, which is the opposite to the front side on which the flash discharge tube 105 is arranged. Further, the inductor 307 is arranged so that the winding axis A, which is the winding axis of the winding thereof, runs parallel to the X direction. One side in the direction of the winding axis A in the inductor 307 faces the conductive member 400, and the other side faces the capacitor 305.

That is, the capacitor 305 is arranged on the second face 307*b* side opposite to the first face 307*a* side on which the conductive member 400 is arranged in the direction of the winding axis A of the inductor 307.

In the present embodiment, the radiation magnetic field generated from the inductor 307 can be reduced by the conductive member 400 as described in the fourth embodiment, and the magnetic field reaching the image sensor device 113 can thus be reduced. Further, in the present embodiment, the inductance reduction of the inductor 307 due to the conductive member 400 can be suppressed to a small level or prevented, as described in the fourth embodiment.

Therefore, according to the present embodiment, it is possible to reduce noise in a captured image taken by the imaging apparatus 110 while avoiding malfunction of the flash emitting apparatus 100 or the like due to an inductance reduction of the inductor 307.

The imaging apparatus 110 can control the exposure time on the image sensor device 113 by using the shutter and capture an image of the subject P while controlling the flash emitting apparatus 100 to cause the flash emitting apparatus 100 to emit light in the flash emission mode or the focal plane emission mode. In the present embodiment, the magnetic field reaching the image sensor device 113 can be reduced as described above. Thus, in the present embodiment, noise in a captured image can be reduced even when the imaging apparatus 110 captures an image of the subject P with a fast-speed shutter with the electronic shutter while causing the flash emitting apparatus 100 to emit light in the focal plane emission mode. When the imaging apparatus 110 is used to capture an image of the subject P in such a way, the flash emitting apparatus 100 and the imaging apparatus 110 may be in the clip-on state, may be in the bracket state, or may be in a state other than these states. However, when the imaging apparatus 110 is used to capture an image of the subject P, it is preferable to establish a state where the conductive member 400 is located between the inductor 307 and the image sensor device 113. When an image is captured in such a state, the magnetic field reaching the image sensor device 113 can be reliably reduced.

Note that, although the case where the electric unit 1 according to the fourth embodiment is used in the flash emitting apparatus 100 has been described in the present embodiment, the electric unit 1 according to the fifth embodiment may be used in the flash emitting apparatus 100.

Example

Electromagnetic field simulations were performed for cases of Example 4, Comparative Example 4, and Comparative Example 5 to evaluate the reduction effect on the magnetic field reaching the image sensor device 113 and the suppression effect on the inductance reduction of the inductor 307. Example 4 represents a case where the electric unit 1 according to the fourth embodiment illustrated in FIG. 17A and FIG. 17B is arranged in the rear side of the capacitor 305. Comparative Example 4 represents a case where the electric unit 1*a* with only the inductor 307 illustrated in FIG. 18A is arranged in the rear side of the capacitor 305. Comparative Example 5 represents a case where the electric unit 1*b* with the inductor 307 being covered with the plate conductive member 400 illustrated in FIG. 18B is arranged on the rear side of the capacitor 305. As the electromagnetic field simulator, EM-Studio by CST was used. Further, an air-core coil was used as the inductor 307. The thickness of the conductive member 400 was 0.3 mm for both Example 4 and Comparative Example 5.

In the electromagnetic field simulation, current with a frequency of 50 kHz and an amplitude of 24 A was applied to the inductor 307.

Figure 26:
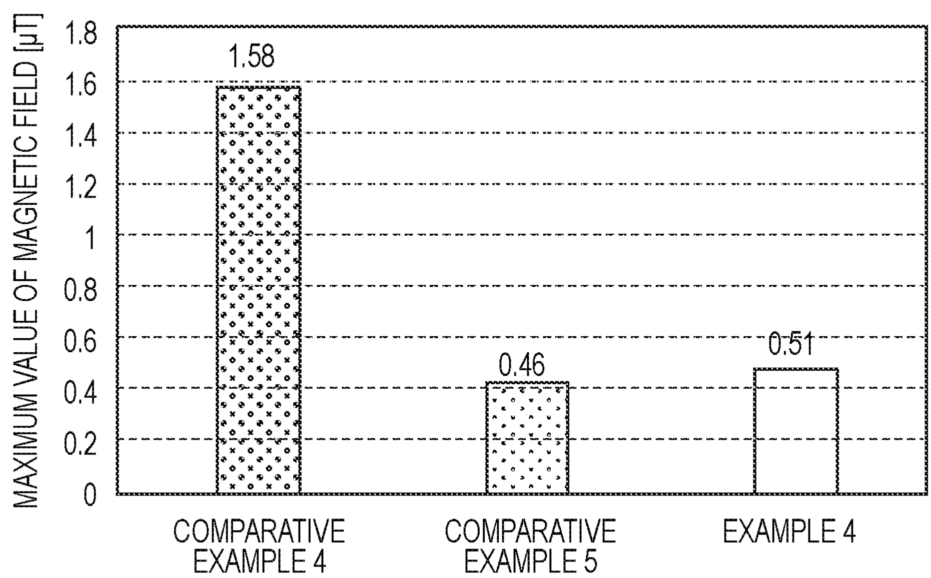
FIG. 26 is a graph illustrating a magnetic field reduction effect obtained for electric units of Example 4, Comparative Example 4, and Comparative Example 5.

FIG. 26 is a graph illustrating results found by the electromagnetic field simulations on the magnetic field reaching the image sensor device 113 for the cases of Example 4, Comparative Example 4, and Comparative Example 5. FIG. 26 illustrates the maximum value of the magnetic field that reached the image sensor device 113. In the case of Comparative Example 4, the maximum value of the magnetic field was 1.58 μT. On the other hand, in the case of Comparative Example 5, the maximum value of the magnetic field was 0.46 μT, that is, decreased by about 71% from the case of Comparative Example 4. Further, in the case of Example 4, the maximum value of the magnetic field was 0.51 μT, that is, decreased by about 68% from the case of Comparative Example 4. It is found from these results that there is little difference in the reduction effect on the magnetic field reaching the image sensor device 113 whether the inductor 307 is covered with the plate conductive member 400 or covered with the curved conductive member 400.

Figure 27:
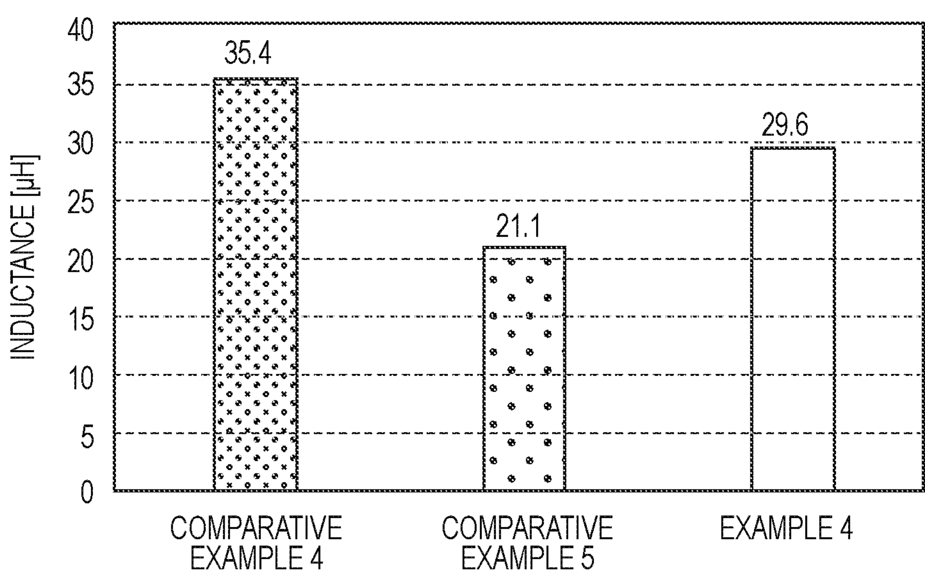
FIG. 27 is a graph illustrating an effect of suppressing a reduction in the inductance obtained for the electric units of Example 4, Comparative Example 4, and Comparative Example 5.

FIG. 27 is a graph illustrating results found by the electromagnetic field simulations on the inductance of the inductor 307 for the cases of Example 4, Comparative Example 4, and Comparative Example 5. In the case of Comparative Example 4, the inductance was 35.4 μH. On the other hand, in the case of Comparative Example 5, the inductance was 21.1 μH, that is, decreased by about 41% from the case of the Comparative Example 4. Further, in the case of Example 4, the inductance was 29.6 μH, that is, decreased by about 16% from the case of the Comparative Example 4. It is found from these results that the inductance reduction was suppressed by 25% with the electric unit 1 according to the fourth embodiment being employed compared to the case where the plate conductive member 400 was used.

It was confirmed from the above comparison results that it is possible to suppress the inductance reduction of the inductor 307 to a small level while reducing the radiation magnetic field from the inductor 307 by applying the electric unit 1 according to the fourth embodiment to the flash emitting apparatus 100.

According to the present invention, a radiation magnetic field generated from an inductor of a light emitting apparatus can be reduced.

According to the present invention, it is possible to suppress an inductance reduction of an inductor to a small level or prevent the same while reducing a radiation magnetic field generated from the inductor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-065950, filed Apr. 13, 2023, and Japanese Patent Application No. 2023-121233, filed Jul. 26, 2023, which are hereby incorporated by reference herein in their entirety.

What is claimed is:

1. A light emitting apparatus comprising:

a light emitting component;

an inductor electrically connected to the light emitting component; and a conductive member, wherein the inductor includes a conductor wiring wound about a straight winding axis and has a first face and a second face that intersect the winding axis, wherein the conductive member is nonmagnetic and is arranged on the first face side with respect to the inductor, and wherein the light emitting apparatus satisfies that:

(i) in a cross section including the winding axis, a first distance between an intersection of the winding axis with the conductive member and an intersection of the winding axis with the first face is longer than a second distance between an intersection of a line extending parallel to the winding axis at each of both ends of the inductor in the first face with the conductive member and each of both the ends of the inductor, and/or (ii) in a cross section including the winding axis, the conductive member is curved or bent protruding to the opposite side of the inductor so as to cover the inductor.

2. The light emitting apparatus according to claim 1, wherein (i) is satisfied.

3. The light emitting apparatus according to claim 1, wherein between the center of the conductive member in the cross section and an outer end in a direction along the first face of the conductive member, the conductive member includes a portion where the angle of the conductive member or of a tangent on the conductive member relative to a line extending parallel to the winding axis is an acute angle or an obtuse angle.

4. The light emitting apparatus according to claim 2, wherein the inductor has a shape defined by the conductor wiring being wound in a circular cylindrical shape, and wherein the first distance is greater than or equal to the inner diameter of the inductor.

5. The light emitting apparatus according to claim 1, wherein the inductor has a shape defined by the conductor wiring being wound in a circular cylindrical shape, and wherein the conductive member has a diameter larger than the outer diameter of the inductor.

6. The light emitting apparatus according to claim 1, wherein the inductor has a shape defined by the conductor wiring being wound in a circular cylindrical shape, and wherein in the conductive member, a portion located inside an average diameter of the inductor in planar view in a direction of the winding axis is located at a position distant from the inductor by the inner diameter of the inductor or more.

7. The light emitting apparatus according to claim 1, wherein in the conductive member, a portion located outside an average diameter of the inductor in planar view in a direction of the winding axis is located closer to the inductor than a portion located inside the average diameter in the planar view.

8. The light emitting apparatus according to claim 1 comprising a magnetic member arranged adjacent to a side face between the first face and the second face of the inductor.

9. The light emitting apparatus according to claim 8, wherein the magnetic member is arranged so as to cover a part or the whole of the side face of the inductor.

10. The light emitting apparatus according to claim 1, wherein the conductive member is formed of a curved portion in the cross section.

11. The light emitting apparatus according to claim 1, wherein the conductive member has a portion angled relative to a direction orthogonal to a direction of the winding axis in the cross section.

12. The light emitting apparatus according to claim 1, wherein the conductive member has a portion parallel to a direction orthogonal to a direction of the winding axis and a portion angled relative to a direction orthogonal to the direction of the winding axis in the cross section.

13. The light emitting apparatus according to claim 1, wherein the inductor is an air-core coil.

14. The light emitting apparatus according to claim 1 comprising a casing, the light emitting component, the inductor, and the conductive member being arranged in the casing.

15. The light emitting apparatus according to claim 1 comprising a capacitor configured to supply power to cause the light emitting component to emit light, wherein the capacitor is arranged on the side of the second face of the inductor.

16. The light emitting apparatus according to claim 1, wherein the light emitting component is a flash discharge tube.

17. An imaging system comprising:

the light emitting apparatus according to claim 1; and an imaging apparatus having an image sensor device.

18. An imaging apparatus comprising an image sensor device, wherein the imaging apparatus captures an image of a subject by using a shutter to control an exposure time on the image sensor device while controlling the light emitting apparatus according to claim 1 to cause the light emitting apparatus to emit light in a mode to repeatedly, continually emit flashes.

19. An imaging method comprising using an imaging apparatus having an image sensor device and the light emitting apparatus according to claim 1 to capture an image of a subject by using a shutter to control an exposure time on the image sensor device while causing the light emitting apparatus to emit light in a mode to repeatedly, continually emit flashes.

20. A light emitting apparatus comprising:

a light emitting component;

an inductor electrically connected to the light emitting component;

a conductive member; and a magnetic member, wherein the conductive member is arranged on at least one end side in a direction of a winding axis of the inductor so as to intersect the winding axis, and wherein the magnetic member is arranged on a side face side of the inductor.

21. The light emitting apparatus according to claim 20, wherein the magnetic member is arranged so as to cover at least a part of the side face of the inductor.

22. The light emitting apparatus according to claim 20, comprising a capacitor configured to supply power to cause the light emitting component to emit light, wherein the conductive member is an exterior casing of the capacitor.

23. The light emitting apparatus according to claim 20, comprising a capacitor configured to supply power to cause the light emitting component to emit light, wherein the capacitor is arranged on the one end side in the direction of the winding axis of the inductor via the conductive member.

24. The light emitting apparatus according to claim 20, wherein the conductive member has a diameter greater than or equal to a half a sum of an outer diameter of the inductor and an inner diameter of the inductor, and/or the conductive member has the diameter larger than the outer diameter of the inductor.

25. The light emitting apparatus according to claim 20, comprising a control circuit that controls power supplied to the light emitting component, wherein a ratio of a thickness of the conductive member to a skin depth of the conductive member at an operation frequency of the control circuit is greater than or equal to 5%.

26. The light emitting apparatus according to claim 20, wherein the magnetic member has a relative magnetic permeability of 50 to 200,000, and/or wherein the magnetic member has a height greater than or equal to 75% of the thickness of the inductor in the direction of the winding axis.

27. The light emitting apparatus according to claim 20, comprising a control circuit that controls power supplied to the light emitting component, wherein the operation frequency of the control circuit is 10 kHz to 1 MHz.

28. The light emitting apparatus according to claim 20, comprising a further conductive member, wherein the further conductive member is arranged on the other end side in the direction of the winding axis of the inductor so as to intersect the winding axis.

29. The light emitting apparatus according to claim 28, comprising:

a capacitor configured to supply power to cause the light emitting component to emit light; and a printed wiring board connecting the capacitor and the inductor to each other, wherein the further conductive member is arranged on the other end side via the printed wiring board, or the printed wiring board includes the further conductive member.

30. The light emitting apparatus according to claim 20, wherein the inductor is an air-core coil.

31. The light emitting apparatus according to claim 20, wherein the light emitting component is a flash discharge tube.

32. An imaging system comprising:

the light emitting apparatus according to claim 20; and an imaging apparatus having an image sensor device, wherein the magnetic member is located between the inductor and the image sensor device.

33. An imaging apparatus comprising an image sensor device, wherein the imaging apparatus captures an image of a subject by using an electronic shutter to control an exposure time on the image sensor device while controlling the light emitting apparatus according to claim 20 to cause the light emitting apparatus to emit light in a mode to repeatedly, continually emit flashes.

34. An imaging method comprising using an imaging apparatus having an image sensor device and the light emitting apparatus according to claim 20 to capture an image of a subject by the imaging apparatus in a state, where the magnetic member is located between the inductor and the image sensor device.

* * * * *